United States Patent [19]
Ohara et al.

[11] Patent Number: 5,926,617
[45] Date of Patent: Jul. 20, 1999

[54] METHOD OF DETERMINING DISPLAY CHARACTERISTIC FUNCTION

[75] Inventors: Kiyotaka Ohara, Nagoya; Masaaki Hibino, Yokkaichi; Koji Kobayakawa, Ichinomiya; Masashi Ueda, Nagoya; Masaaki Hori, Tajimi; Yasunari Yoshida, Aichi-ken, all of Japan

[73] Assignee: Brother Kogyo Kabushiki Kaisha, Nagoya, Japan

[21] Appl. No.: 08/856,397

[22] Filed: May 14, 1997

[30] Foreign Application Priority Data

May 16, 1996 [JP] Japan ................................. 8-121834

[51] Int. Cl.$^6$ ..................................... H04N 17/00
[52] U.S. Cl. .......................... 395/109; 395/109; 348/650; 348/652; 348/655; 348/656; 358/501; 358/504; 358/518; 358/529; 345/63; 345/89; 345/146; 345/147
[58] Field of Search ............................ 395/109; 348/650, 348/652, 655, 656, 645; 358/501, 504, 518, 527, 529; 345/63, 89, 146–147

[56] References Cited

U.S. PATENT DOCUMENTS

| | | | |
|---|---|---|---|
| 4,959,711 | 9/1990 | Hung et al. | 358/80 |
| 5,289,993 | 3/1994 | Edgar et al. | 348/180 |
| 5,298,993 | 3/1994 | Edgar et al. | 348/180 |
| 5,381,349 | 1/1995 | Winter et al. | 364/526 |

FOREIGN PATENT DOCUMENTS

| | | | |
|---|---|---|---|
| B2-59-41227 | 10/1984 | Japan | B29D 3/02 |
| A-63-162248 | 7/1988 | Japan | B41J 3/00 |
| A-6-35430 | 2/1994 | Japan | G09G 5/00 |

*Primary Examiner*—Scott Rogers
*Assistant Examiner*—Lance W. Sealey
*Attorney, Agent, or Firm*—Oliff & Berridge, PLC

[57] ABSTRACT

A test image 40 for determining a gamma value has a plurality of first gradation patterns 20 and a plurality of second gradation patterns 30. The patterns 20 and 30 are arranged alternately in a vertical direction. In each pattern 20, a relative brightness linearly increases from left to right. In each pattern 30, a relative brightness linearly decreases from left to right.

41 Claims, 18 Drawing Sheets

METHOD OF DETERMINING DISPLAY CHARACTERISTIC FUNCTION

BACKGROUND OF THE INVENTION

1. Field of the Invention

The present invention relates to a method of achieving a display-to-printer color matching in a system provided with a display and a printer.

2. Description of Related Art

Color of light emitted from a display such as a CRT and color printed by a color printer are different from each other due to the differences between their employing coloring mechanisms and their using primary colors. Accordingly, in a system provided with both a display and a printer, it is desirable to achieve a color matching between the display and the printer.

SUMMARY OF THE INVENTION

It is conceivable to construct a system as shown in FIG. 1 to edit and then print a color image with the use of a personal computer. In this system, the personal computer A is connected to both a color display B and a color printer C.

In order to control the display B to display his/her desired color, the user utilizes an application program A0 stored in the computer A to change an input value X inputted to the display driver A1. When the desired color is properly displayed on the display B, the color printer C is actuated to print that color. That is, the input value X determined as providing the desired display color is inputted to the printer driver A2, and is printed into a print output.

It is now assumed that the display B displays a color Yd when inputted with the input value X and that the printer C prints a color Yp when inputted with the same input value X. It is desirable that the color Yd is the same as the color Yp. That is, it is desirable to satisfy the condition Yd=Yp.

Generally, the display B has a non-linear display characteristic shown in FIG. 2. The display B produces each color based on red, green, and blue color components, while the printer C produces each color based on cyan, magenta, yellow, and black color components. It is therefore very difficult to provide a color matching between the colors produced by the display B and by the printer C.

As shown in FIG. 2, according to the display characteristic of the display B, relative brightness Yd changes non-linearly as the inputted value X varies. The relative brightness Yd is defined as brightness relative to a possible maximum brightness where the possible maximum brightness is normalized to 255. The relative brightness Yd decreases as the inputted value X decreases, and the relative brightness decreases to zero (0) when the inputted value X reaches a certain value BP which is called as a "black point". Assuming that each of the inputted value X and the relative brightness Yd changes in the range of 0 to 255, the display characteristic can be approximated by the following exponential function:

$$Yd=0$$

when X<BP $$Yd=\{(X-BP)/(255-BP)\}^{\gamma} \cdot 255$$

when X≧BP

It is therefore apparent that the display characteristic can be determined when the black point BP and the index number γ are known. It is noted, however, that the black point BK and the gamma value γ change according to the user's control of a contrast volume and signal volumes R, G, and B of the display B. The black point BK and the gamma value γ also change in time and according to respective viewers' visual sensitivities to light.

U.S. Pat. No. 5,298,993 discloses how to determine a display characteristic while controlling the display to display a checker board pattern.

Based on the determination method disclosed in the patent, it is conceivable to provide a determination process as described below.

As shown in FIG. 3(a), the display is controlled to display a brightness-fixed image FI and a brightness-variable image VI next to each other. The brightness-fixed image FI is constructed from a plurality of white square pixels and a plurality of black square pixels. Initially, the number of the white square pixels is set equal to the number of the black square pixels. The white and black pixels are arranged in alternation with each other. Each white square pixel is produced based on an input value X of 255, and each black square pixel is produced based on an input value X of zero (0). That is, the number N0 of black pixels produced by the input value X of zero (0) and the number N255 of white pixels produced by the input value X of 255 satisfy the equation N0:N255=1:1. The two tones of the white and black pixels visually blend into a single tone defined as a relative brightness of 50%. On the other hand, the brightness-variable image VI is comprised solely of single-tone pixels which are produced by a single input value Xvari. The input value Xvari is set to be variable.

A user varies the input value Xvari until both images FI and VI appear equally bright. The input value Xvari, which is inputted when the images FI and VI appear equally bright, is set as a value X50 for setting the relative brightness of 50%. Then, a point (X50, 50% brightness) is plotted on a graph of FIG. 3(b).

Next, the brightness-fixed image FI is changed so that the number of the white pixels becomes three times as large as the number of the black pixels. That is, the number N0 of black pixels produced by the input value X of zero (0) and the number N255 of white pixels produced by the input value X of 255 satisfy the equation N0:N255=1:3. The two tones of the white and black pixels visually blend into a single tone defined as a relative brightness of 75%. In the same manner as described above, the user varies the input value Xvari until the image VI exhibits the same brightness as that of the image FI. The input value Xvari, which provides the same brightness as that of the image FI, is set as a value X75 which can provide a relative brightness of 75%. Then, another point (X75, 75% brightness) is plotted on the graph of FIG. 3(b).

Similarly, the brightness-fixed image FI is changed so that the number of the white pixels becomes one third of the number of the black pixels. That is, the number N0 of pixels produced by the input value X of zero (0) and the number N255 of pixels produced by the input value X of 255 satisfy the equation N0: N255=3:1. The two tones of the white and black pixels visually blend into a single tone defined as a relative brightness of 25%. The user varies the input value Xvari until the image VI exhibits the same brightness as that of the image FI. The input value Xvari, which provides the same brightness as that of the image FI, is now set as a value X25 which can provide the relative brightness of 25%. Then, still another point (X25, 25% brightness) is plotted on the graph of FIG. 3(b).

After an already known black point BP is set on the graph of FIG. 3(b), a display characteristic function curve is approximated by a curved line which passes through those four points: point (0, BP), point (X25, 25% brightness), point (X50, 50% brightness), and point (X75, 75% brightness).

In the above-described process, the user has to compare the two gray tones of the images FI and VI with each other. It is noted, however, that the tone of the image FI is determined based on how the black and white tones visually blend into a single gray tone. Contrarily, the tone of the image VI is comprised solely of a single tone. Because the tones of the images FI and VI are thus established in different manners, it is very difficult for the user to compare those tones.

Additionally, according to the above-described process, it is necessary to plot a plurality of points on the graph to approximate the display characteristic function. In order to plot the plurality of points, the user has to perform the visual comparing operations the plurality of times. The operation is very troublesome.

Accordingly, an object of the present invention is to provide an improved method which allows the user to perform an easy and simple operation to determine the display characteristic function.

In order to attain the above and other objects, the present invention provides a method of determining a display characteristic function of a display, the method comprising the steps of: initially setting at least one assumption on a display characteristic function of a display, the display characteristic function being indicative of a relationship between an input level of image data to be inputted to the display and relative brightness of an image to be displayed on the display by the image data; controlling the display to display at least one test image based on the set at least one assumption, each of the at least one test image including a plurality of first gradation patterns and a plurality of second gradation patterns, brightness of each first gradation pattern changing from a predetermined first value to a predetermined second value in one direction in a manner determined by a corresponding assumption, brightness of each second gradation pattern changing from the predetermined first value to the predetermined second value in a reverse direction in the manner determined by a corresponding assumption, the first and second gradation patterns being arranged alternately in the test image so that portions of the second brightness in the first gradation patterns are arranged adjacent to portions of the first brightness in the second gradation patterns; selecting one test image whose brightness appears uniform; and determining the display characteristic function of the display based on the assumption that provides the selected test image.

According to another aspect, the present invention provides a device for determining a display characteristic function of a display, the device comprising: means for initially setting at least one assumption on a display characteristic function of a display, the display characteristic function being indicative of a relationship between an input level of image data to be inputted to the display and relative brightness of an image to be displayed on the display by the image data; means for controlling the display to display at least one test image based on the set at least one assumption, each of the at least one test image including a plurality of first gradation patterns and a plurality of second gradation patterns, brightness of each first gradation pattern changing from a predetermined first value to a predetermined second value in one direction in a manner determined by a corresponding assumption, brightness of each second gradation pattern changing from the predetermined first value to the predetermined second value in a reverse direction in the manner determined by a corresponding assumption, the first and second gradation patterns being arranged alternately in the test image so that portions of the second brightness in the first gradation patterns are arranged adjacent to portions of the first brightness in the second gradation patterns; means for selecting one test image whose brightness appears uniform; and means for determining the display characteristic function of the display based on the assumption that provides the selected test image and for storing the determined display characteristic function.

According to a further aspect, the present invention provides a printer system, comprising: a display having a display characteristic function indicative of a relationship between an input level of image data to be inputted to the display and relative brightness of an image to be displayed on the display by the image data; a printer having print control means for performing a printing operation with image data inputted thereto; a device for determining the display characteristic of the display, the device including: means for initially setting at least one assumption on the display characteristic function of the display; means for controlling the display to display at least one test image based on the set at least one assumption, each of the at least one test image including a plurality of first gradation patterns and a plurality of second gradation patterns, brightness of each first gradation pattern changing from a predetermined first value to a predetermined second value in one direction in a manner determined by a corresponding assumption, brightness of each second gradation pattern changing from the predetermined first value to the predetermined second value in a reverse direction in the manner determined by a corresponding assumption, the first and second gradation patterns being arranged alternately in the test image so that portions of the second brightness in the first gradation patterns are arranged adjacent to portions of the first brightness in the second gradation patterns; means for selecting one test image whose brightness appears uniform; and means for determining the display characteristic function of the display based on the assumption that provides the selected test image and for storing the determined display characteristic function; and a printer input data correction device for correcting an input level of image data for being inputted to the print control means based on the display characteristic function stored in the display characteristic function determining and storing means, thereby controlling the printer to print an image consistent with the image displayed on the display.

According to still another aspect, the present invention provides a device for determining a gamma value, the device comprising: means for assuming a gamma value indicative of a display characteristic of a display; means for instructing change of the assumed gamma value; means for controlling the display to display a test image according to the gamma value presently assumed by the assuming means and by the instructing means, the test image including a plurality of first rasters and a plurality of second rasters, brightness of each first raster increasing from a predetermined first value to a predetermined second value from left to right, brightness of each second raster increasing from the predetermined first value to the predetermined second value from right to the left, the first and second rasters being arranged alternately so that portions having the second brightness of the first rasters are arranged adjacent to the portions having the first brightness of the second rasters; means for enabling a user to input a determination instruction to determine a gamma value of the display when the test image appears entirely uniform;

and means for storing, as the gamma value for the display, the gamma value presently assumed when the determining instruction is inputted.

According to still another aspect, the present invention provides a printer system, comprising: a display with a gamma value; a printer having print control means for performing a printing operation with image data inputted thereto; a device for determining a gamma value of the display, the determining device including: means for assuming a gamma value indicative of a display characteristic of a display; means for instructing change of the assumed gamma value; means for controlling the display to display a test image according to the gamma value presently assumed by the assuming means and by the instructing means, the test image including a plurality of first rasters and a plurality of second rasters, brightness of each first raster increasing from a predetermined first value to a predetermined second value from left to right, brightness of each second raster increasing from the predetermined first value to the predetermined second value from right to the left, the first and second rasters being arranged alternately so that portions having the second brightness of the first rasters are arranged adjacent to the portions having the first brightness of the second rasters; means for enabling a user to input a determination instruction to determine a gamma value of the display when the test image appears entirely uniform; and means for storing, as the gamma value for the display, the gamma value presently assumed when the determining instruction is inputted; and printer input data correction means for correcting an input level of image data for being inputted to the print control means based on the gamma value stored in the gamma value storing means, thereby controlling the printer to print an image consistent with the image displayed on the display.

According to a further aspect, the present invention provides a device for determining a display characteristic function, the device comprising: means for setting an assumption for a display characteristic function indicative of a relationship between an input level of image data to be inputted to a display and relative brightness of an image to be displayed on the display with the image data; means for changing the assumption for the display characteristic function; means for controlling the display to display a test image according to a display characteristic function determined based on the assumption, the test image including a plurality of first gradation patterns and a plurality of second gradation patterns, brightness of each first gradation pattern continuously changing from a predetermined minimum value to a predetermined maximum value by every predetermined value in one direction, brightness of each second gradation pattern continuously changing from the predetermined minimum value to the predetermined maximum value by the every predetermined value in a reverse direction, the first and second gradation pattern being arranged alternately so that portions having the maximum brightness in the first gradation patterns are arranged adjacent to portions having the minimum brightness in the second gradation patterns; means for enabling a user to input a determination instruction for determining a display characteristic function for the display when brightness of the test image appears entirely uniform; and means for determining, as a display characteristic function for the display, the display characteristic function determined for the present assumption when the determination instruction is inputted and for storing the determined display characteristic function.

According to still another aspect, the present invention provides a device for determining a display characteristic function, the device comprising: first assumption setting means for setting a first assumption for a display characteristic function indicative of a relationship between an input level of image data to be inputted to a display and relative brightness of an image to be displayed on the display with the image data; second assumption setting means for setting a second assumption which is obtained through changing the first assumption; means for controlling the display to display, on a first image region, a test image according to a display characteristic function determined based on the first assumption, the test image including a plurality of first gradation patterns and a plurality of second gradation patterns, brightness of each first gradation pattern continuously changing from a predetermined minimum value to a predetermined maximum value by every predetermined value in one direction, brightness of each second gradation pattern continuously changing from the predetermined minimum value to the predetermined maximum value by the every predetermined value in a reverse direction, the first and second gradation patterns being arranged alternately so that portions having the maximum brightness in the first gradation patterns are arranged adjacent to portions having the minimum brightness in the second gradation patterns and for simultaneously controlling the display to display, on a second image region, another test image according to the display characteristic function determined based on the second assumption; means for selecting a test image which appears more uniform than the other; and means for determining, as a display characteristic function for the display, the display characteristic function determined based on an assumption that provides the selected test image and for storing the determined display characteristic function.

BRIEF DESCRIPTION OF THE DRAWINGS

The above and other objects, features and advantages of the invention will become more apparent from reading the following description of the preferred embodiment taken in connection with the accompanying drawings in which:

FIGS. 9(a)–9(c) are graphs illustrating how to determine a gamma value according to the first embodiment, in which FIG. 9(a) shows how the test image appears uniform when the brightness of the first and second patterns changes linearly, FIG. 9(b) shows how the test image appears nonuniform when the brightness of the first and second patterns changes nonlinearly, and FIG. 9(c) shows how the test image still appears nonuniform when the brightness of the first and second patterns changes still nonlinearly;

DETAILED DESCRIPTION OF THE PREFERRED EMBODIMENTS

Figure 1:
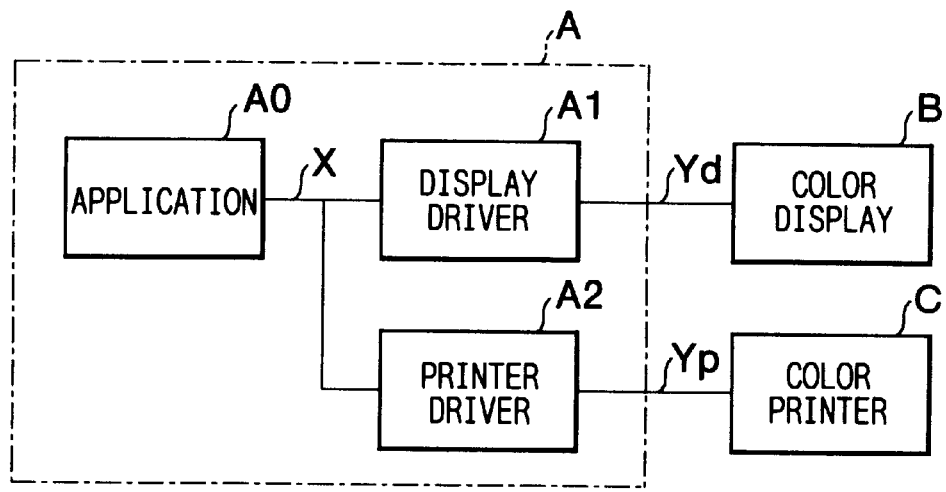
FIG. 1 is a block diagram of a conceivable printer system.
Figure 2:
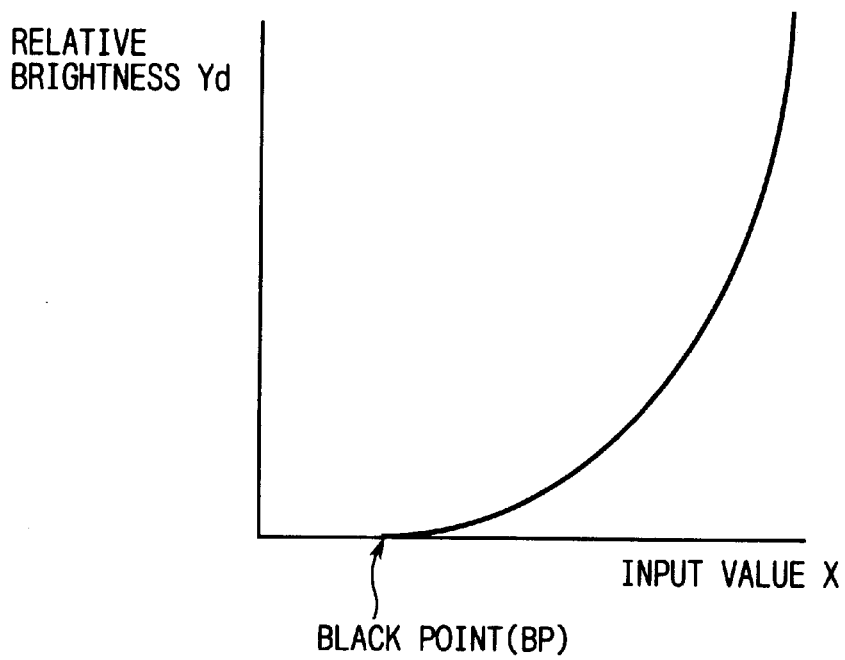
FIG. 2 illustrates a CRT display characteristic.
Figure 3:
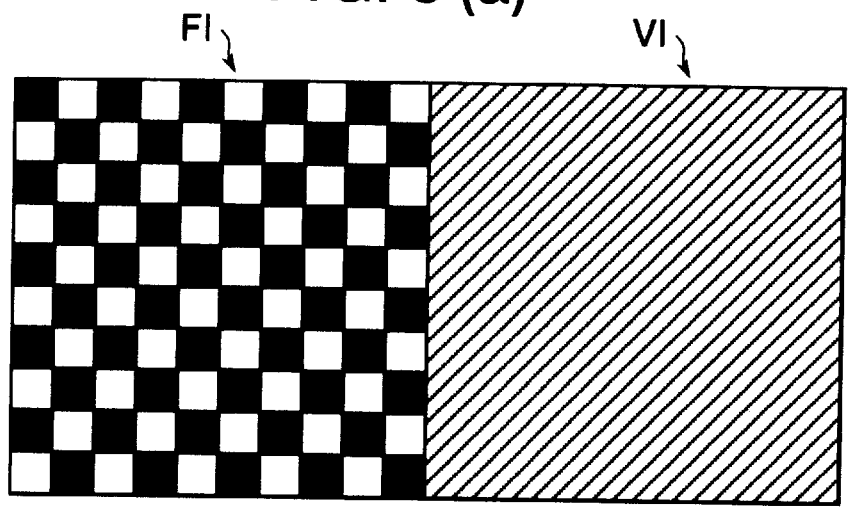
FIG. 3(a) shows a test image displayed during a conceivable display characteristic function determining process.
FIG. 3(b) shows how to plot detected points to approximate display characteristic function.
Figure 3:
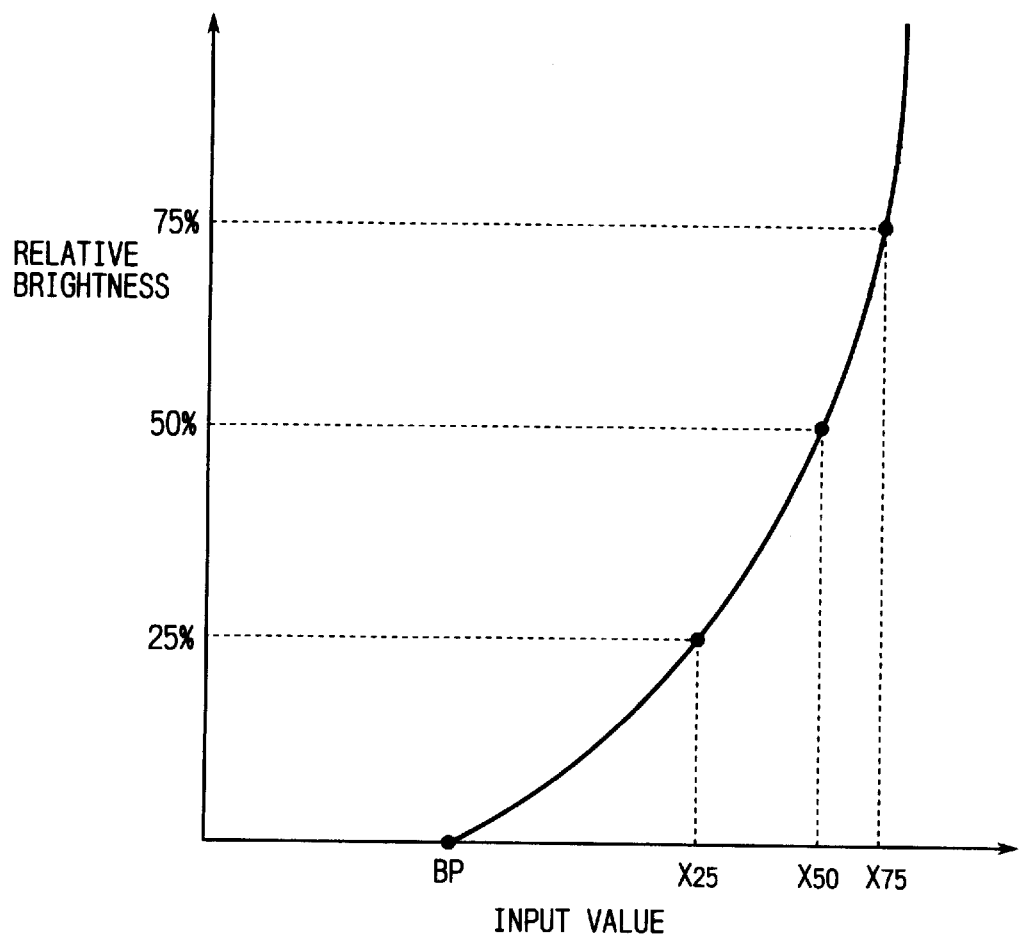

A printer system according to preferred embodiments of the present invention will be described while referring to the accompanying drawings wherein like parts and components are designated by the same reference numerals.

Figure 4:
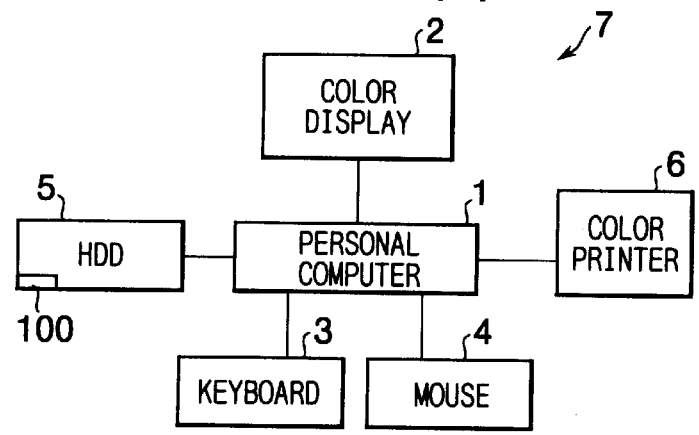
FIG. 4(a) is a block diagram of a printer system of a first embodiment of the present invention.
FIG. 4(b) is a functional block diagram of the printer system of FIG. 4(a)
Figure 4:
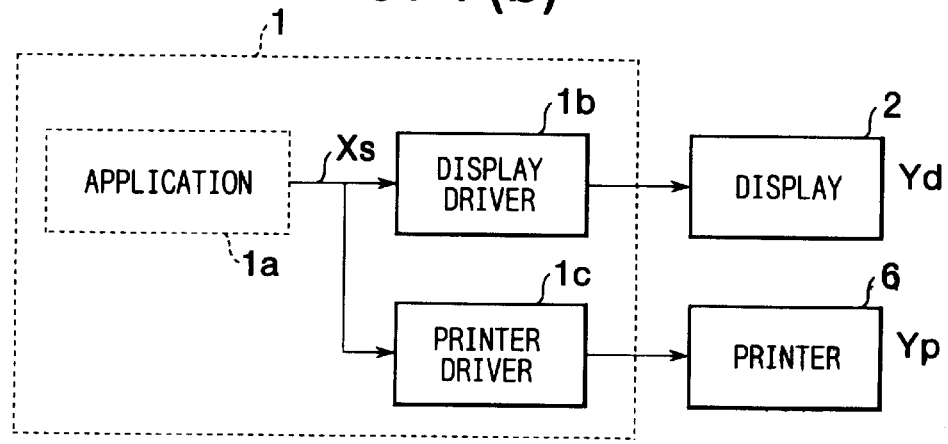

A first embodiment will be described below with reference to FIGS. 4(a)–12. As shown in FIG. 4(a), a system 7 according to the first embodiment is constructed from a personal computer 1 and a color display 2 connected to each other. The personal computer 1 is connected to a keyboard 3, a mouse 4, a hard disk 5, and a color printer 6. The personal computer 1 is installed with: a display characteristic determination process program; a printing color correction process program shown in FIG. 12 which is executed based on a result determined by the display characteristic determination process program; and the like. The display characteristic determination process program includes a black point determining process program shown in FIG. 6, and a gamma value determination process program show in FIG. 10. The computer 1 has operational blocks as shown in FIG. 4(b). That is, the computer 1 is comprised of an application program 1a, a display driver 1b, and a printer driver 1c. The application program 1a includes the above-described various programs and also includes image data (Rin, Gin, Bin) indicative of image data desired to be printed by the printer 6.

Figure 5:
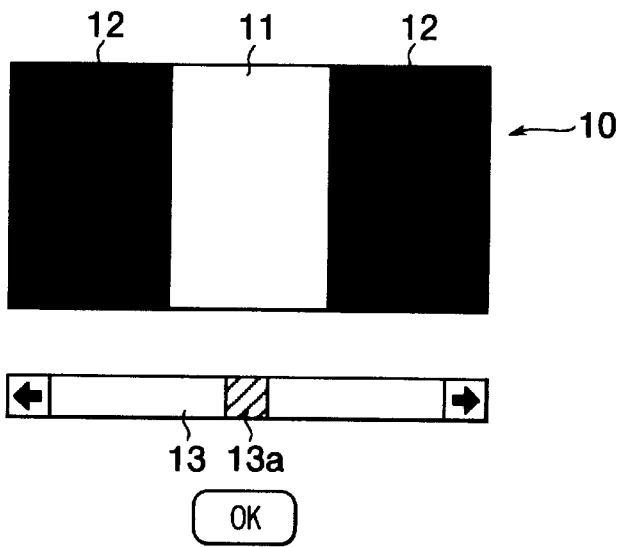
FIG. 5 illustrates a test image for determining a black point.
Figure 6:
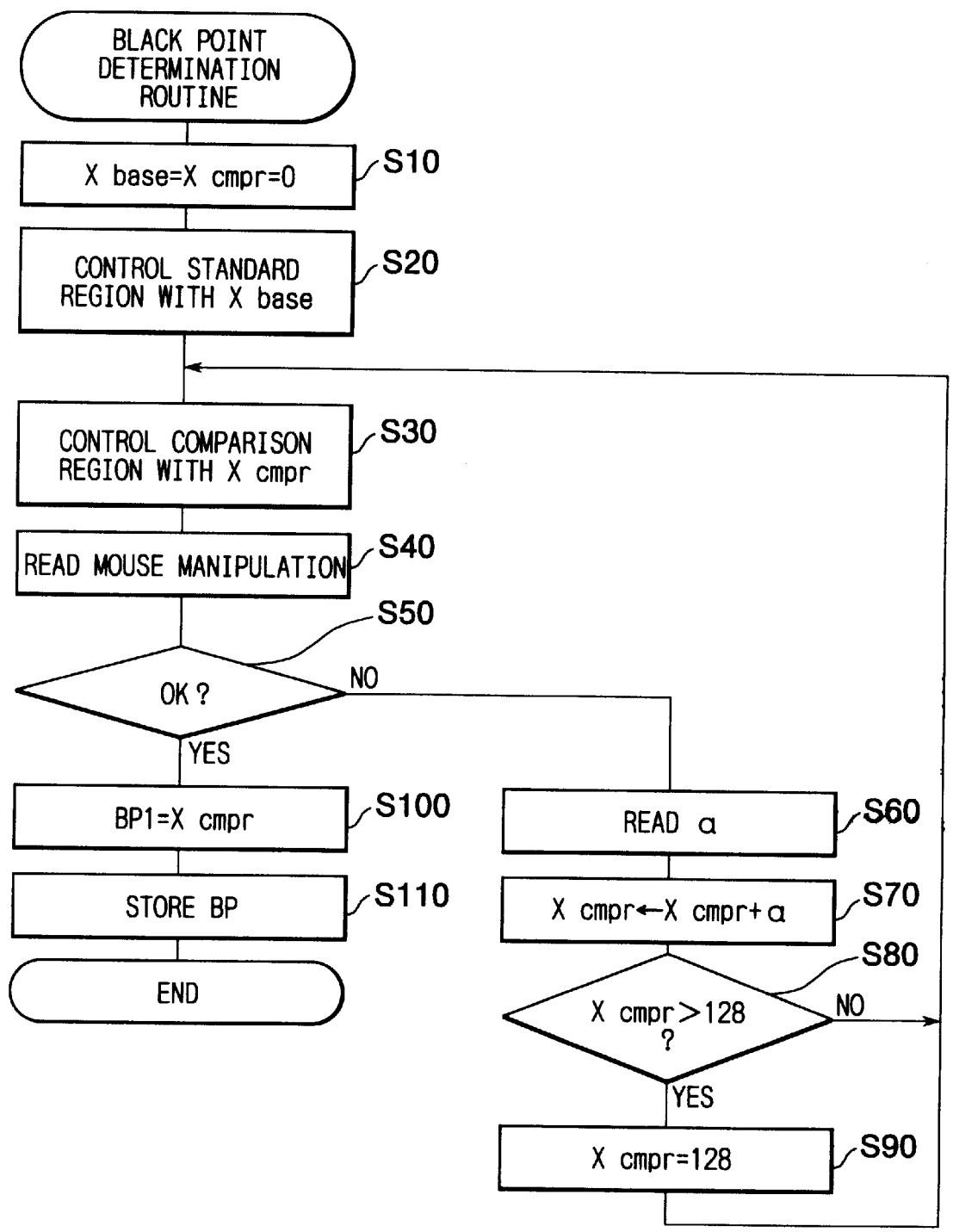
FIG. 6 is a flowchart of a black point determination routine of the first embodiment.

When the display characteristic determination process program is started, a black point determination process program is first executed as shown in FIG. 6, and the computer 1 controls the display 2 to display a BP-determining test image 10 as shown in FIG. 5 on its display screen. In the BP-determining test image 10, a central color patch 11 is sandwiched between a pair of identical color patches 12. A scroll bar 13 is displayed below the test image 10. A slider 13a is slidable along the scroll bar 13 according to a user's manipulation of the mouse 4. The central color patch 11 will be referred to as a comparison brightness region 11 hereinafter. The color patches 12 will be referred to as standard brightness regions 12 hereinafter. The comparison brightness region 11 is displayed with an input value Xcmpr, and the standard brightness regions 12 are displayed with another input value Xbase. The input value Xbase is fixed to zero (0). The input value Xcmpr is set variable among 256 levels from 0 to 255. Each pixel in the standard brightness regions 12 is controlled by an inputted signal (R, G, B) where R=G=B=Xbase. Accordingly, the standard brightness regions 12 display the lowest brightness, i.e., a completely black color.

When the black point determination program is started as shown in FIG. 6, an initialization setting is first performed in S10 to set the input values Xbase and Xcmpr both to zero (0). That is, Xbase=Xcmpr=0. Then, each pixel in the standard brightness regions 12 is controlled by the inputted RGB signal (R, G, B) where R=G=B=Xbase in S20, and each pixel in the comparison brightness regions 10 is controlled by the inputted RGB signal (R, G, B) where R=G=B=Xcmpr in S30. Accordingly, the BP-determining test image 10 initially appears entirely black.

While observing the test image 10, a user move the mouse 4 to slidingly move the slider 13a so as to increase the input value Xcmpr. The user clicks the button on the mouse 4 to input an instruction "OK" when the brightness of the comparison brightness region 11 increases and therefore the region 11 first becomes distinguishable from the black standard brightness regions 12. The computer 1 reads out the user's manipulated state of the mouse 4 in S40. The computer 1 judges in S50 whether or not the operator manipulates the button on the mouse 4 to instruct his/her confirmation instruction "OK". Until receiving the "OK" instruction ("Now" in S50), the computer 1 repeatedly performs a detection process of S60 where the computer 1 detects the present position of the slider 13a and calculates a sliding amount α with which the slider 13a has moved along the scroll bar 13 from its latest position detected at the latest detection step of S60. In S70, the computer 1 renews the input value Xcmpr through adding the present value Xcmpr with the sliding amount α. Then, the comparison brightness region 11 is produced with the newly-set value Xcmpr in S30. It is noted that the sliding amount α is positive when the user has moved the slider 13a in the rightward direction, and the sliding amount α is negative when the user has moved the slider 13a in the leftward direction. It is further noted that the value Xcmpr is limited equal to or smaller than 128 in S80 and S90. That is, Xcmpr≦128. This is because the black point BP is generally small and close to zero (0), and therefore it is unnecessary to change the value Xcmpr higher than 128.

When the computer 1 receives the instruction "OK" from the mouse 4 ("yes" in S50), on the other hand, the computer 1 determines in S100 the present value Xcmpr as a black point BP and stores the black point BP in the hard disk 5 in S110.

Figure 10:
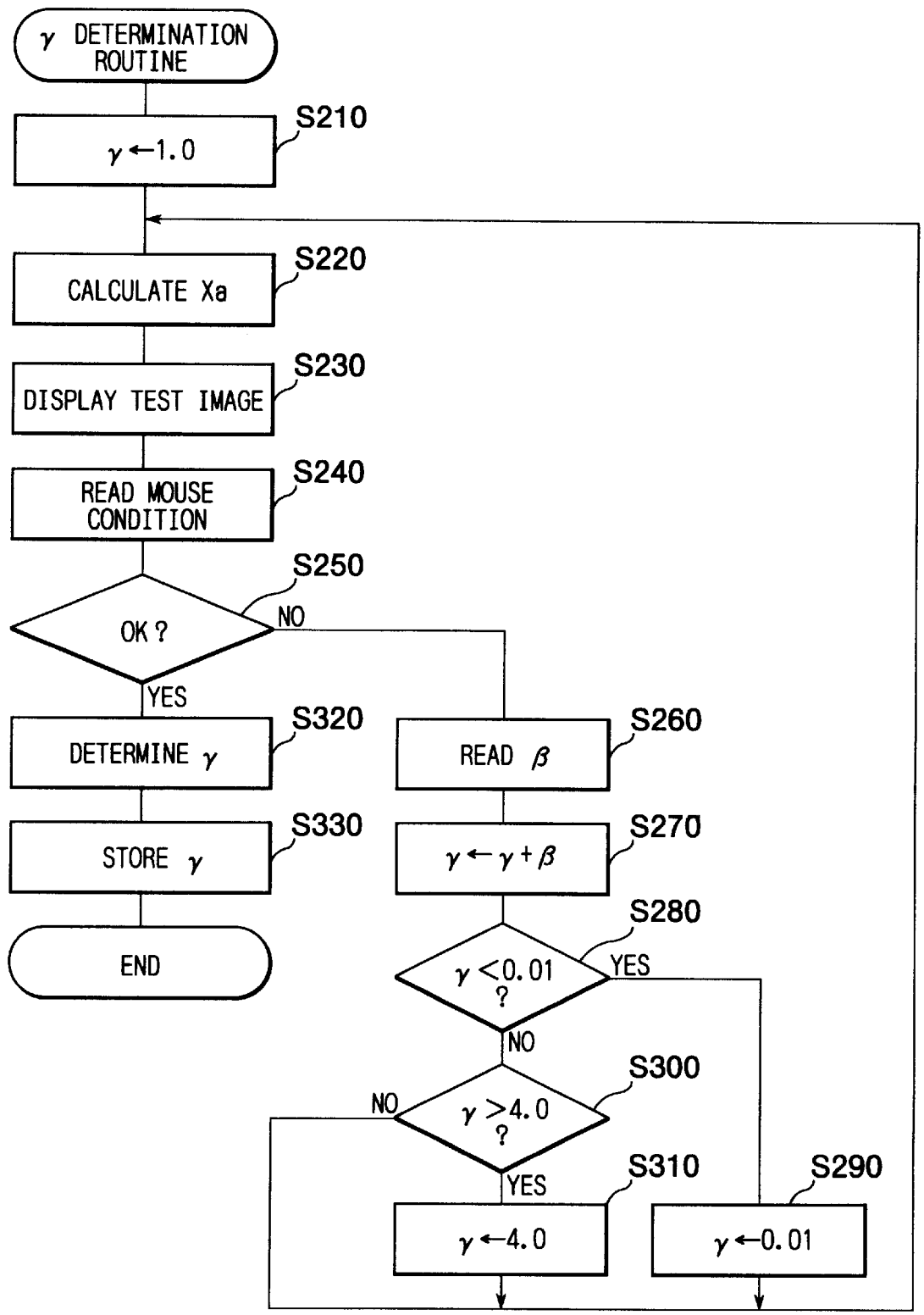
FIG. 10 is a flowchart of a gamma determination routine of the first embodiment.

After the black point determination process is thus completed, a gamma value determination program of FIG. 10 is executed.

Next, a gamma value determination principle employed by the gamma value determination process will be described.

Figure 7:
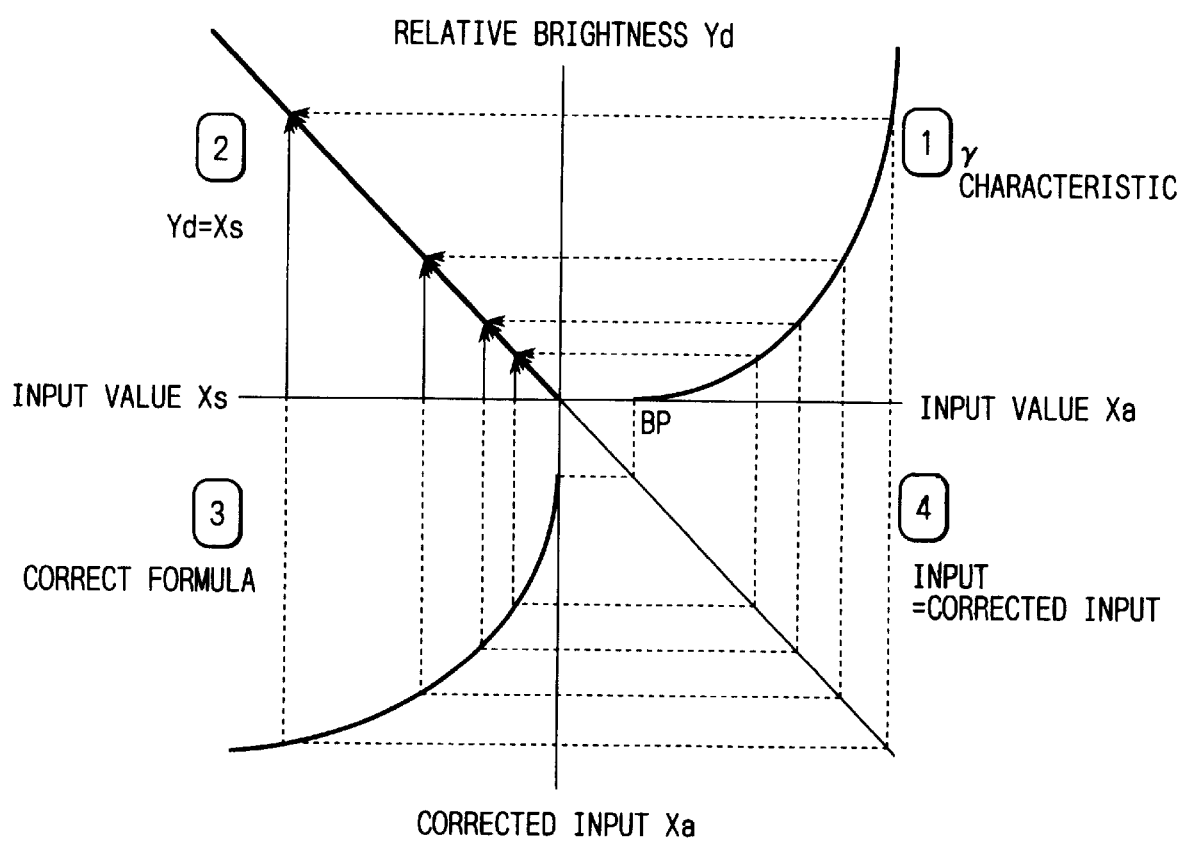
FIG. 7 illustrates a principle of determining a gamma value in the first embodiment.
Figure 8:
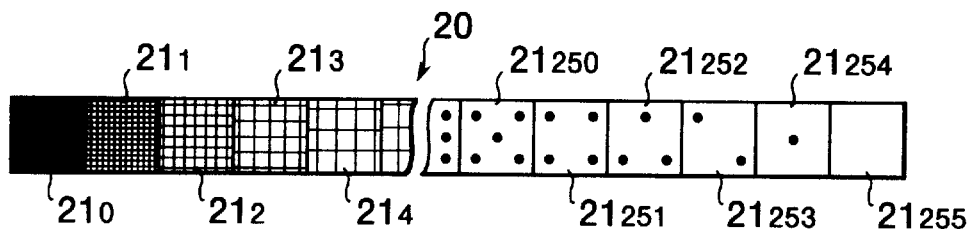
FIG. 8(a) illustrates a first gradation pattern used in the first embodiment.
FIG. 8(b) illustrates a second gradation pattern used in the first embodiment.
FIG. 8(c) illustrates a test image produced by the first and second gradation patterns.
Figure 8:
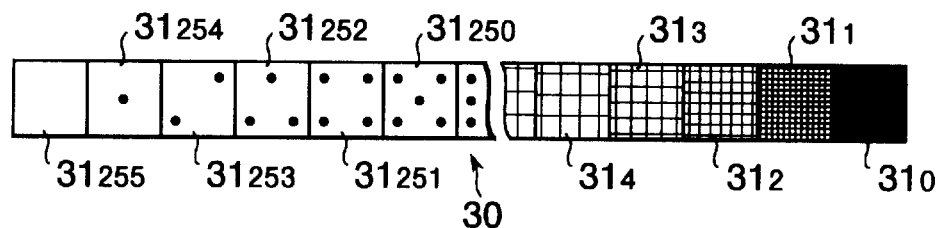
Figure 8:
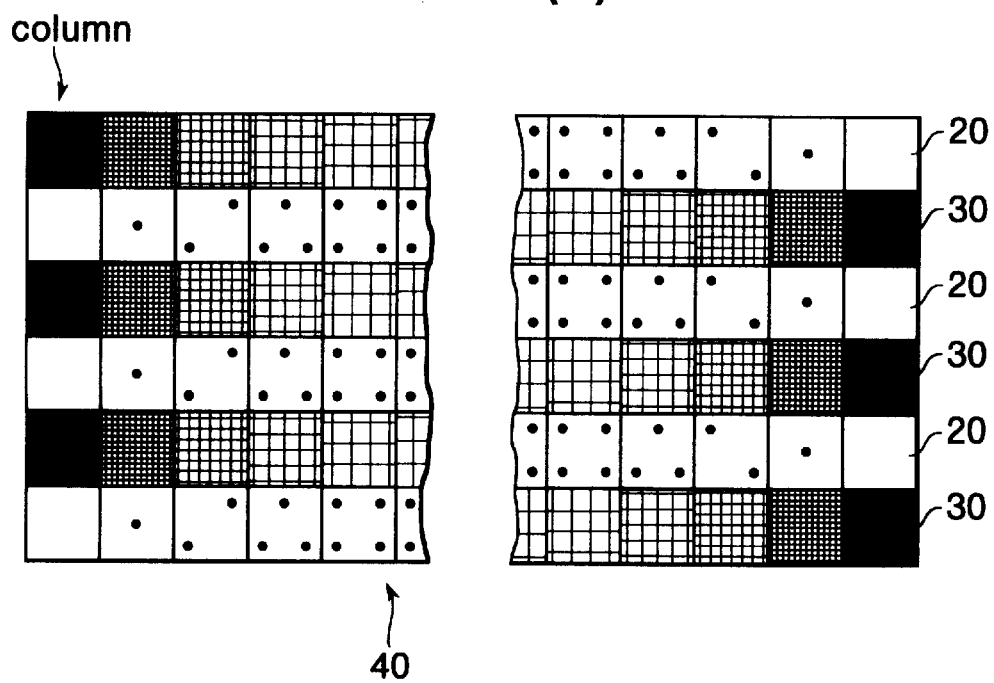
Figure 9:
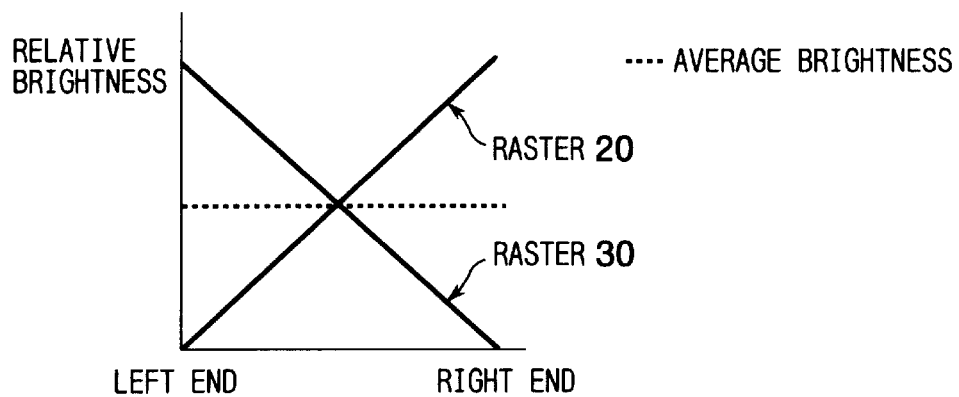
Figure 9:
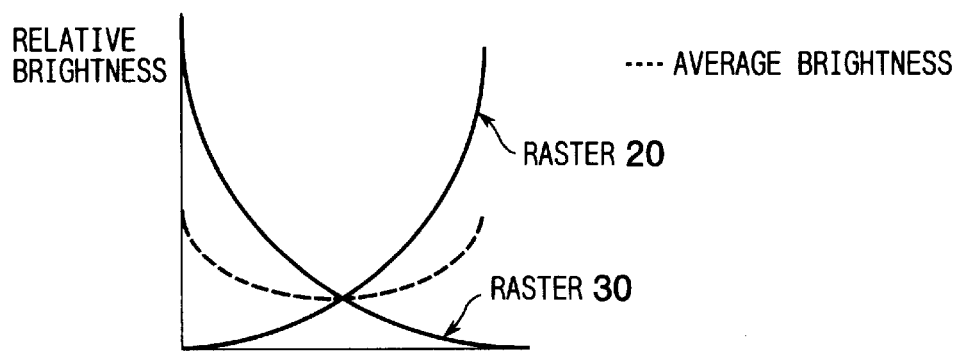
Figure 9:
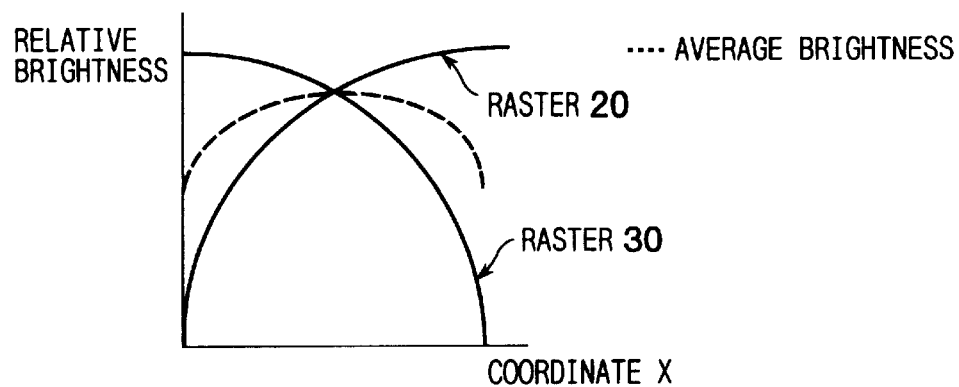

It is now assumed that the gamma characteristic of the display is generally represented as shown in a first quadrant ① of FIG. 7. The gamma characteristic indicates the relationship between the input value Xa inputted to the display 2 and the relative brightness Yd obtained on the display 2. The relative brightness Yd is defined as a brightness relative to a possible maximum brightness where the possible maximum brightness is normalized to 255. According to the principle of the present invention, a correction function is established between the input value Xa and a corrected input value Xs which provides the condition Yd=Xs where $0 \leq Xs \leq 255$ and $0 \leq Yd \leq 255$ as shown in the second quadrant ②. This correction function is shown in the third quadrant ③, and indicates the relationship between the value Xa and the corrected value Xs.

The correction function will be described below in more detail. It is now assumed that the gamma characteristic of the display is defined as the following formula (2):

$$Yd = \{(X-BP)/(255-BP)\}^{\gamma} \cdot 255 \qquad (2)$$

This formula (2) can be expressed in another way as shown in the following formula (3):

$$X = (Yd/255)^{-\gamma} \cdot (255-BP) + BP \qquad (3)$$

Xs is substituted for the value Yd in the formula (3), and Xa is substituted for the value X in the formula (3). As a result, the following correction function (4) is obtained:

$$Xa = (Xs/255)^{-\gamma} \cdot (255-BP) + BP \qquad (4)$$

It is apparent that the correction function (4) can be determined when the values BP and $\gamma$ are known.

According to the function (4), when the value Xs linearly changes, the tone level Xa of the input signal, which is inputted to the display 2, will change as shown in the third quadrant ③ FIG. 7, and accordingly the relative brightness Yd of the display 2 will linearly change as shown in the second quadrant ②.

It is therefore apparent that if the function (4) is correctly determined, when the tone level Xa of the input signal is calculated through the function (4) using the linearly-changing value Xs, the display 2 can be controlled to display a linearly-changing brightness Yd.

For example, it becomes possible to produce a first gradation pattern 20 in which the relative brightness linearly changes in its lengthwise direction as shown in FIG. 8(a). The first gradation pattern 20 is of a horizontally-extending long bar shape which is comprised of 256 unit boxes $21_0$, $21_1$, ..., and $21_{255}$. The 256 unit boxes are arranged in the lengthwise direction of the pattern 20 from the left to the right. The unit boxes $21_0$, $21_1$, ..., and $21_{255}$ are formed by the input tone values Xa which are obtained by calculating the function (4) with the values Xs of 0, 1, 2, ..., 255, respectively. Accordingly, the unit boxes $21_0$, $21_1$, ..., and $21_{255}$ properly exhibit the relative brightness values Yd of 0, 1, 2, ..., 255, respectively. Thus, in the pattern 20, the relative brightness continuously increases one by one from the left to the right.

In the same manner as described above, a second gradation pattern 30 can also be produced, in which the relative brightness linearly decreases in its lengthwise direction from left to right as shown in FIG. 8(b). The second gradation pattern 30 is also of a horizontally-extending long bar shape which is comprised of 256 unit boxes $31_0$, $31_1$, ..., and $31_{255}$ which are arranged in the lengthwise direction of the pattern 30 from the right to the left. Similarly to the unit boxes $21_0$, $21_1$, ..., and $21_{255}$, the unit boxes $31_0$, $31_1$, ..., and $31_{255}$ are controlled by the input tone signals Xa which are obtained through calculating the function (4) with the value Xs of 0, 1, 2, ..., 255, respectively. The unit boxes $31_0$, $31_1$, ..., and $31_{255}$ therefore properly exhibit relative brightness values Yd of 0, 1, 2, ..., 255, respectively. Thus, in the pattern 30, the relative brightness decreases one by one from the left to the right.

According to the principle of the present embodiment, a plurality of first patterns 20 and a plurality of second patterns 30 are prepared in the above-described manner. The patterns 20 and 30 are arranged alternately in a vertical direction as shown in FIG. 8(c) into an entire test image 40. The test image 40 therefore has 256 columns, each column extending in a vertical direction and being formed with alternately-arranged two tones. For example, in the leftend column, unit boxes with tone levels of 255 and 0 are alternately arranged. At the next column, unit boxes with tone levels of 254 and 1 are alternately arranged. In each of the 256 columns, the alternately-arranged two tones visually blend into a single tone of 127.5 because $(0+255)/2=(1+254)/2=(2+253)/2=\ldots =(255+0)/2=127.5$. The entire test image 40 will therefore be visually perceived by the user to exhibit an entirely uniform brightness of the level of 127.5.

It is noted that in FIGS. 8(a)–8(c), the brightness of each unit box in each pattern 20 and 30 is represented by density of black dots or black lines. This illustration is intended only for illustrating how the brightness changes in each pattern 20 and 30. In this example, each of the patterns 20 and 30 is formed in a single raster. For example, each unit box $21_i$ ($31_i$) (where $0 \leq i \leq 255$) may be formed from a single pixel. The display can easily generate the test image 40 through using each raster for a corresponding gradation pattern because the display is controlled in a raster scanning operation.

According to the present embodiment, an assumption is given for the gamma value $\gamma$, and the formula (4) is determined with the assumed gamma value. Then, the input values Xa for the patterns 20 and 30 are obtained through calculating the determined formula (4) with the values Xs of 0 to 255. When the assumed gamma value is equal to the actual gamma value of the display 2, the brightness of each pattern 20 and 30 will successfully change linearly. Accordingly, the entire test image 40 will be visually perceived by a user to have a uniform brightness entirely over the test image 40. When the relative brightness Yd of each pattern 20 linearly increases from the left to the right and the relative brightness Yd of each pattern 30 linearly decreases from the left to the right as indicated by solid lines as shown in FIG. 9(a), when the patterns 20 and 30 are arranged alternately, an average brightness indicated by a dotted line in the graph will become uniform entirely over the image 40 from the left to the right.

Contrarily, when the assumed gamma value is different from the actual gamma value of the display 2, even though the input values Xa for the patterns 20 and 30 are determined through calculating the determined formula (4) with the values Xs of 0 to 255, the brightness of each pattern 20 and 30 will fail to change linearly. FIGS. 9(b) and 9(c) show the cases where the assumed gamma value is different from the actual gamma value and therefore the brightness of each of the patterns 20 and 30 fails to linearly change from the left to the right. In these cases, the central portion of the test image 40 may possibly appear darker than the right and left ends as shown in FIG. 9(b) or may possibly appear lighter than the right and left ends as shown in FIG. 9(c).

It is therefore apparent that when the test image 40 appears uniform as shown in FIG. 9(a), the assumed gamma value γ for the correction function (4) is known as equal to the actual gamma value of the display 2. When the gamma value is thus determined, the display characteristic function (2) is determined based on the gamma value and the black point BP which is already determined through the determination process of FIG. 6.

The gamma value determination process will be described below with reference to FIG. 10.

Figure 11:
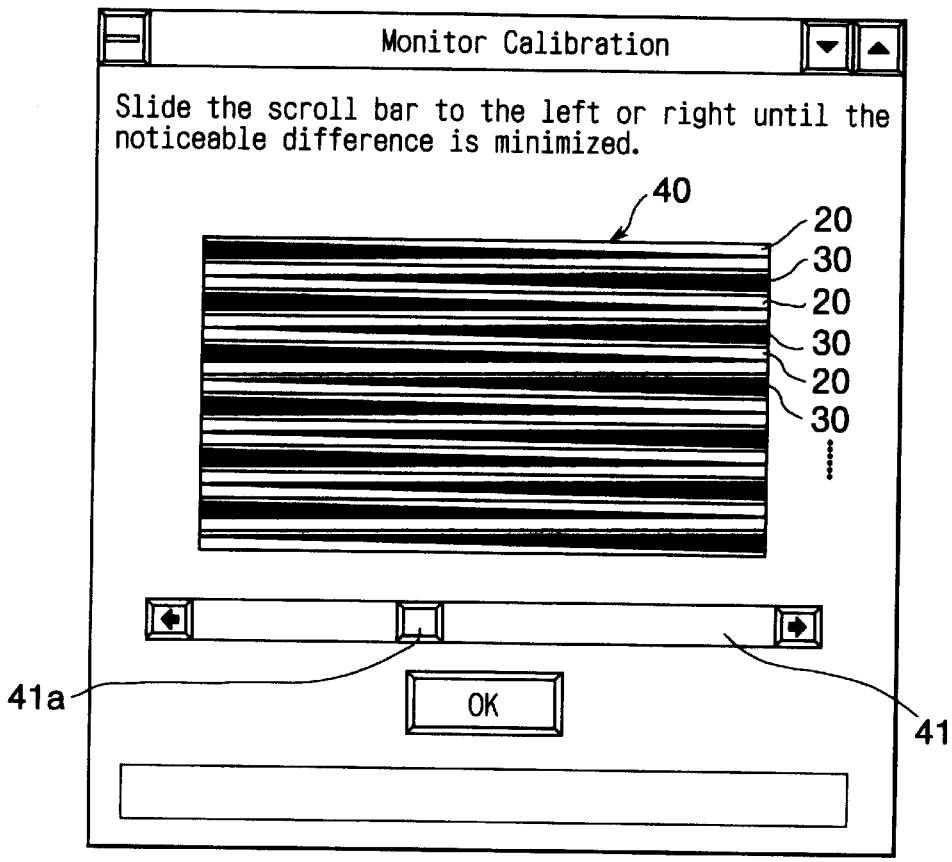
FIG. 11 illustrates a display screen during the gamma determination routine.

When the gamma value determination process is started, the gamma value γ is first assumed as 1.0 in S210. Then, the assumed gamma value and the already-determined black point value BP are substituted for the values γ and BP in the formula (4). Then, the input values Xs of 0, 1, 2, . . . , and 255 are successively substituted for the value Xs in the formula (4), thereby successively calculating input values Xa which should be inputted to the respective unit boxes $21_0$ ($31_0$) through $21_{255}$ ($31_{255}$) in S220. Thus, the respective unit boxes in the patterns 20 and 30 are controlled with input signals (R, G, B) where R=G=B=Xa in S230. As a result, the gamma determination test image 40 is displayed on the display screen as shown in FIG. 11. A scroll bar 41 is also displayed on the display screen as shown in FIG. 11. In this figure, each gradation pattern 20 and 30 is illustrated by a horizontally-extending black narrow triangle. The gradation in brightness of each gradation pattern 20 and 30 is represented by change in the vertical width of the corresponding triangle. That is, as the relative brightness of each pattern 20 and 30 decreases, the vertical width of the corresponding triangle increases.

When the gamma determination test image 40 is thus displayed, the user moves the mouse 4 to move the slider 41a, thereby changing the gamma value γ. The user clicks the button on the mouse 4 to input his/her instruction "OK" when the brightness of the test image 40 becomes uniform entirely over the image 40. Accordingly, the computer 1 reads out the manipulating condition of the mouse 4 in S240. Then, the computer judges whether or not the user manipulates or clicks the mouse button to input the "OK" instruction in S250. Until receiving the instruction "OK" ("No" in S250), the computer 1 repeatedly performs a detection process of S260 where the computer 1 detects the present position of the slider 41a and calculates a sliding amount β with which the slider 41a has moved along the scroll bar 41 from its latest position detected at the latest detection step of S260. The sliding amount β is positive when the slider 41a has moved rightwardly and the sliding amount β is negative when the slider 41a has moved leftwardly. The computer 1 then renews in S270 the present gamma value γ through adding the present gamma value γ with the sliding amount β. It is noted that the value γis limited in a range of 0.01 to 4.0 in S280–S310. That is, 0.01≦γ≦4.0. The test image 40 is then produced based on the renewed value γ in S220–S230.

When the instruction "OK" is detected ("yes" in S250), on the other hand, the present gamma value γ is set as the gamma value γ of the display 2 in S320 and is stored in the hard disk 5 in S330.

When the display characteristic function (1) (i.e. the value γ and BP) is thus determined, a printing correction operation is executed based on the display characteristic function in a manner described below.

Figure 12:
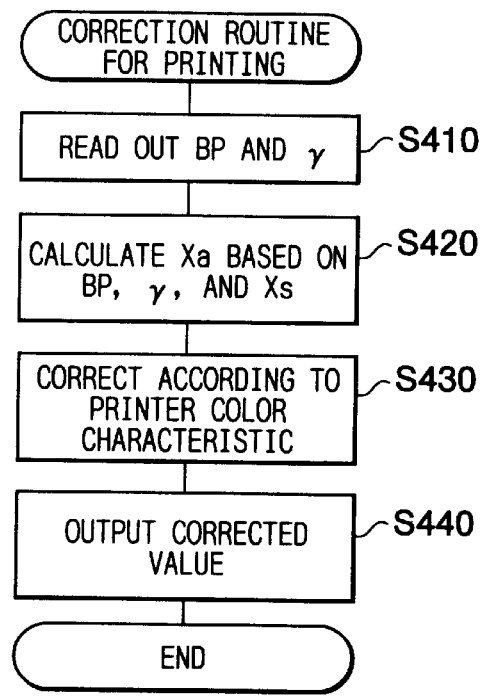
FIG. 12 is a flowchart of a printing correction routine in the first embodiment.

During the printing correction operation, as shown in FIG. 12, the values BP and γ are first retrieved from the hard disk 5 in S410. Then, in S420, image data (Rin, Gin, Bin), indicative of an image desired to be printed, is retrieved from the application 1a. The display 2 is controlled by the image data (Rin, Gin, Bin) to display the image. Also in S420, the retrieved data (Rin, Gin, Bin) and the values BP and γ are respectively substituted for the values Xs, BP, and γ in the formula (4), thereby calculating corrected image data (Rcor, Gcor, Bcor). That is, the corrected image data (Rcor, Gcor, Bcor) is calculated by the following formulas:

$Rcor=(Rin/255)^{-\gamma}\cdot(255-BP)+BP$ $Gcor=(Gin/255)^{-\gamma}\cdot(255-BP)+BP$ $Bcor=(Bin/255)^{-\gamma}\cdot(255-BP)+BP$ The corrected image data (Rcor, Gcor, Bcor) is then adjusted based on coloring characteristic of the printer 6 in S430, and is outputted to the printer 6. It is noted that the coloring characteristic of the printer 6 is previously determined and stored in the hard disk 5.

That is, the hard disk 5 previously stores therein a look up table (LUT) 100. The LUT 100 includes a plurality of sets of data to be used for converting RGB values (Ri, Gi, Bi) defined in RGB colorimetric system into print control signals (Ci, Mi, Yi, Ki) for controlling the printer 6.

The LUT 100 is described below in greater detail.

A three-dimensional RGB calorimetric system space is defined as a color space where a R axis, a G axis, and a B axis extend perpendicularly to one another. The RGB colorimetric system space is uniformly divided by a lattice into a plurality of rectangular parallelepipeds. Vertex points of the plural rectangular parallelepipeds are arranged as a plurality of lattice points. Every two adjacent lattice points are separated by an equal distance of 16 in each of the R, G, and B axes. The LUT 100 stores therein a plurality of sets of RGB values (Ri, Gi, Bi) indicative of the respective lattice points. The LUT 100 also stores therein a plurality of sets of CMYK control signal values (Ci, Mi, Yi, Ki) in correspondence with the plurality of sets of RGB values (Ri, Gi, Bi). Each set of CMYK control signal values (Ci, Mi, Yi, Ki) is determined as a control signal for controlling the printer 6 to reproduce the same color as that of a corresponding lattice point (Ri, Gi, Bi) defined in the RGB calorimetric space. Details of the LUT 100 are described in co-pending U.S. patent application Ser. No. 08/751,554, the disclosure of which is hereby incorporated by reference.

The corrected image data (Rcor, Gcor, Bcor) is adjusted or converted into print data (Cout, Mout, Yout, Kout) with the use of the LUT 100 in S430, in a manner described below.

Figure 25:
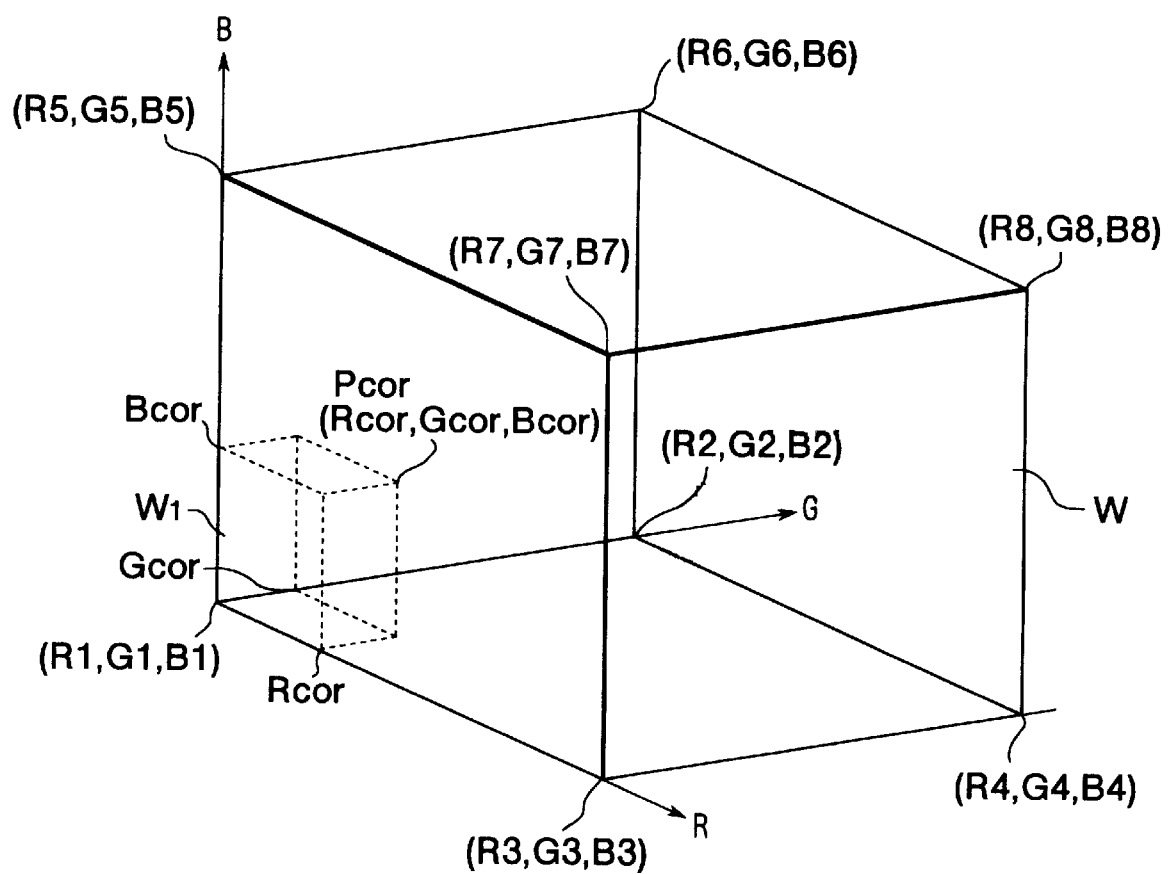
FIG. 25 illustrates how an interpolation calculation is performed in a three-dimensional RGB colorimetric space.

First, eight lattice points (Ri, Gi, Bi), that surround a corrected input color point Pcor indicated by the corrected RGB value set (Rcor, Gcor, Bcor), are first determined in the RGB calorimetric system where. That is, eight lattice points (R1, G1, B1) through (R8, G8, B8) surrounding the corrected input color point Pcor are determined as shown in FIG. 25. Then, eight sets of CMYK control signal value sets (Ci, Mi, Yi, Ki), stored in the LUT 100 in correspondence with the determined eight lattice points (Ri, Gi, Bi), are retrieved from the LUT 100. Thus, (C1, M1, Y1, K1) through (C8, M8, Y8, K8) are retrieved from the LUT 100. Then, a weighted average for each set of CMYK control signal values (Ci, Mi, Yi, Ki) is calculated through a volume interpolation method. It is assumed that a rectangular parallelepiped W, which surrounds the corrected input color point Pcor and which is defined by the eight lattice points (R1, G1, B1) through (R8, G8, B8), has a volume "A". A smaller rectangular parallelepiped W1 is defined as a rectangular parallelepiped having the vertex point Pcor and the vertex point (R1, G1, B1) as opposite or diagonal vertex points. It is now assumed that the rectangular parallelepiped W1 has a volume "v1." A weight coefficient for the lattice point (R8, G8, B8) is calculated as a value obtained by dividing the volume "v1" by the volume "A". In a similar manner, although not shown in FIG. 25, other small rectangular parallelepipeds W2 through W8 are defined to have the vertex point Pcor and the vertex points (R2, G2, B2) through (R8, G8, B8) as the diagonal or opposite vertex points. Weight coefficients for the vertex points opposite to the vertex points (R2, G2, B2) through (R8, G8, B8) are respectively obtained by dividing the volumes "v2" through "v8" of the rectangular parallelepipeds W2 through W8 by the volume "A."

Thus, values Cout, Mout, Yout, and Kout in the CMYK value set (Cout, Mout, Yout, Kout) are calculated in the following manner:

$$Cout = (v1 \cdot C8 + v2 \cdot C7 + v3 \cdot C6 + v4 \cdot C5 + v5 \cdot C4 + v6 \cdot C3 + v7 \cdot C2 + v8 \cdot C1)/A$$

$$Mout = (v1 \cdot M8 + v2 \cdot M7 + v3 \cdot M6 + v4 \cdot M5 + v5 \cdot M4 + v6 \cdot M3 + v7 \cdot M2 + v8 \cdot M1)/A$$

$$Yout = (v1 \cdot Y8 + v2 \cdot Y7 + v3 \cdot Y6 + v4 \cdot Y5 + v5 \cdot Y4 + v6 \cdot Y3 + v7 \cdot Y2 + v8 \cdot Y1)/A$$

$$Kout = (v1 \cdot K8 + v2 \cdot K7 + v3 \cdot K6 + v4 \cdot K5 + v5 \cdot K4 + v6 \cdot K3 + v7 \cdot K2 + v8 \cdot K1)/A$$

Thus obtained print data set (Cout, Mout, Yout, Kout) is outputted to the printer 6 and printed thereby in S440.

As described above, according to the printer system of the present embodiment, color matching is properly attained between the color printed by the printer 6 and the color displayed on the display 2. Accordingly, the user can edit an image on the display 2 while observing his/her desired color status. The gamma value is determined with the use of the test image 40 which is produced according to a single display format. Accordingly, the user can easily and accurately judge whether the test image 40 has uniform brightness.

A second embodiment will be described below with reference to FIGS. 13–15. The second embodiment employs the same process as that of the first embodiment for determining the black point. The second embodiment employs a gamma determination process program shown in FIG. 13 in place of the program of FIG. 10 employed by the first embodiment.

Figure 13:
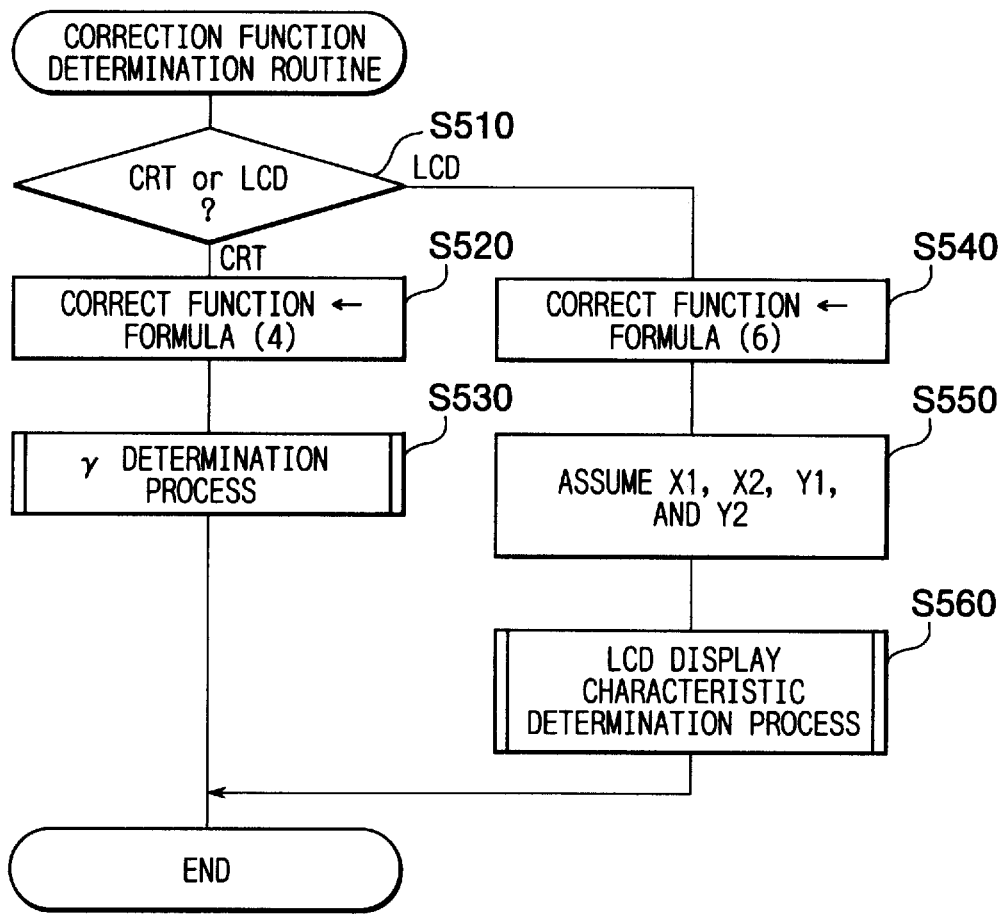
FIG. 13 is a flowchart of a function determination routine in a second embodiment.

According to the present embodiment, as shown in FIG. 13, the computer 1 first enables the user in S510 to select a type of the display 2 presently employed in the system 7 of FIG. 4(*a*). That is, the computer 1 enables the user to select a LCD or a CRT as the type of the presently-employed display 2. When the CRT is selected, the formula (4) is employed as a correction function in S520 in the same manner as in the first embodiment. The process for determining a gamma value is achieved in S530 in the same manner as in S210–S330 of the first embodiment.

Figure 14:
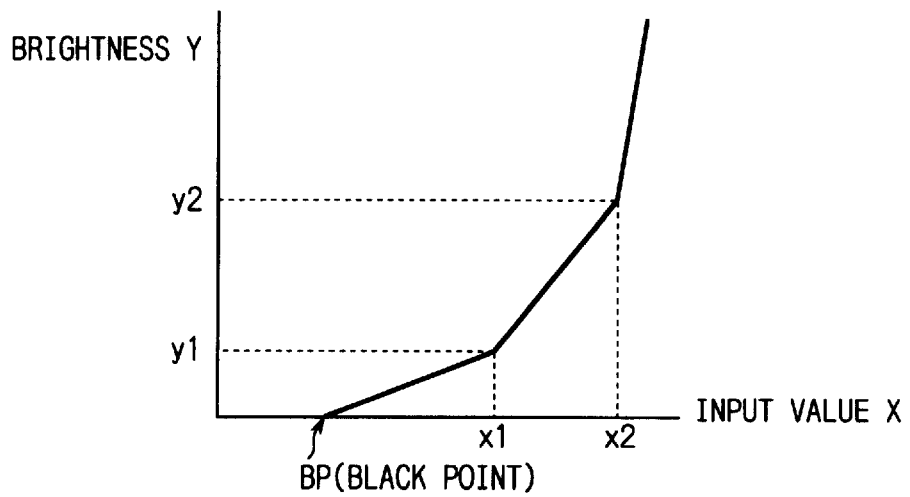
FIG. 14 illustrates a display characteristic of a LCD.
Figure 15:
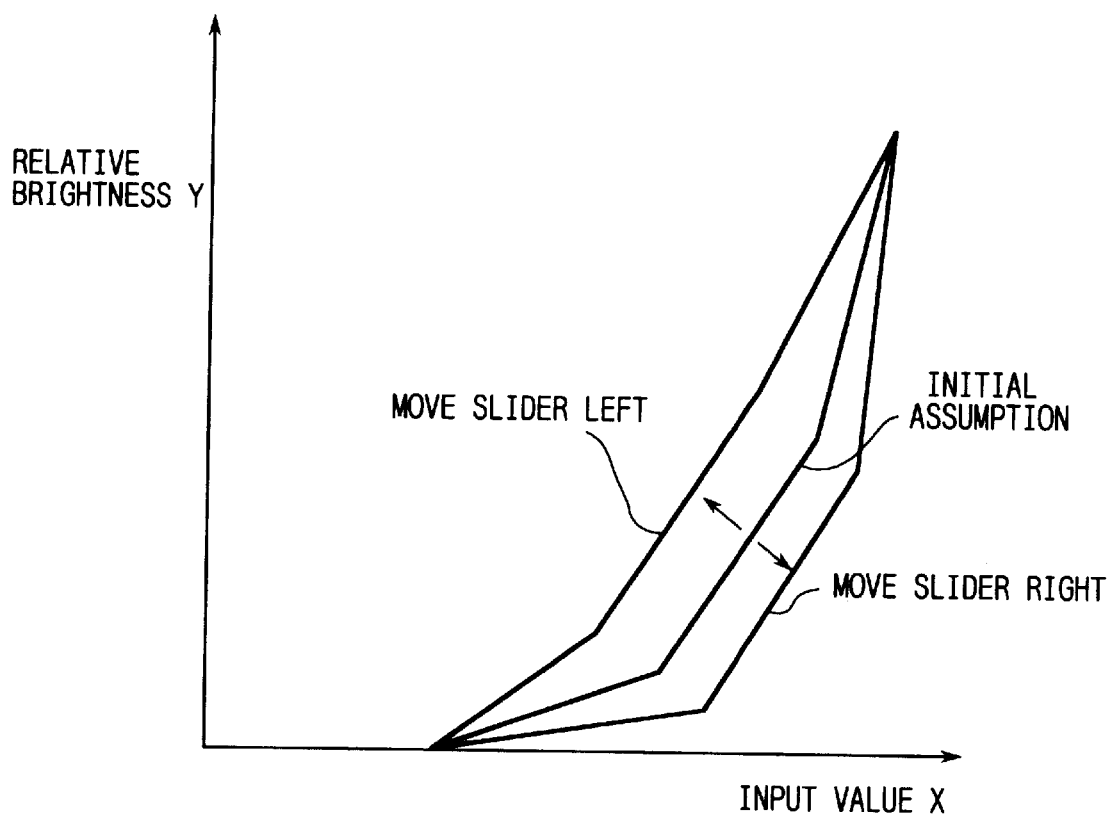
FIG. 15 illustrates a process of S560 in the second embodiment.

When the LCD is selected in S510, on the other hand, a correction function is selected for a LCD display characteristic as shown in FIG. 14. The LCD display characteristic is expressed by the following formulas (5):

$$Y = 0$$

where $X < BP$, $$Y = \{Y1/(X1-BP)\} \cdot (X-BP)$$

where $BP \leq X < X1$, $$Y = \{(Y2-Y1)/(X2-X1)\} \cdot (X-X1)$$

where $X1 \leq X < X2$, and $$Y = \{(255-Y2)/(255-X2)\} \cdot (X-X2) \quad (5)$$

where $X2 \leq X$

Accordingly, the correction functions (6-1) through (6-3) are obtained when the values of Xa and Xs are substituted for the values X and Y in the formula (5). That is, the correction functions (6-1) through (6-3) are expressed as follows:

$$Xa = Xs/\{Y1/(X1-BP)\} + BP \quad (6-1),$$

where $0 \leq Xs < Y1$ $$Xa = Xs/\{(Y2-Y1)/(X2-X1)\} + X1 \quad (6-2),$$

where $Y1 \leq Xs < Y2$
and $$Xa = Xs/\{(255-Y2)/(255-X2)\} + X2 \quad (6-3)$$

where $Y2 \leq Xs$

Then, in S550, the values X1, X2, Y1, and Y2 for the correction functions (6-1)–(6-3) are first assumed as specific values. Then, a LCD display characteristic determination process is attained in S560. During the process of S560, a test image 41 is produced based on the assumed values X1, X2, Y1, and Y2 in the same manner as in the first embodiment. That is, the values Xa to be inputted to the respective unit boxes of each pattern 20 and 30 are calculated through substituting 0, 1, 2, . . . , and 255 for the values Xs in the corresponding functions (6-1)–(6-3) with using the assumed values X1, X2, Y1, and Y2.

While observing the test image 41, the user moves the slider 41*a* on the scroll bar 41. The computer 1 detects the sliding movement of the slider 41*a*, and changes the values X1, X2, Y1, and Y2 while maintaining the slope of a line segment, defined by the function (6-2), to be fixed to the initially-assumed value as shown in FIG. 15. The user manipulates the mouse 4 to input an instruction "OK" when the brightness of the test image 41 becomes entirely uniform. Then, the values X1, X2, Y1, and Y2, that are used when the user inputs the instruction "OK", are employed to determine the correction characteristic functions (6-1)–(6-3). Accordingly, in the present embodiment, it is possible to provide a display characteristic proper to any kind of display. It is preferable to thus set the different gamma characteristic assumptions on respective types of displays because the display characteristics are widely distributed according to the display types such as the CRT and LCD.

A third embodiment will be described below with reference to FIG. 16.

Figure 16:
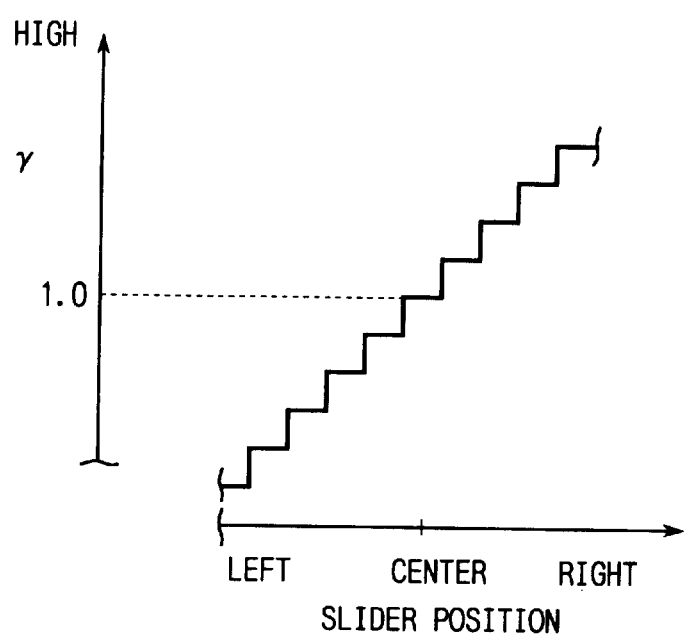
FIG. 16 illustrates a process of S270 in a third embodiment.

The present embodiment is the same as the first embodiment except that the gamma value γ will be changed in a stepwise manner as shown in FIG. 16 according to the movement of the slider 41*a* during the process of S270 in FIG. 10. Accordingly, the color state of the test image 41 will change in a stepwise manner according to the user's control of the slider 41*a*. The color state of the test image 41 will not change slightly or continuously. The user can more easily detect when the brightness of the image 41 becomes uniform.

Figure 17:
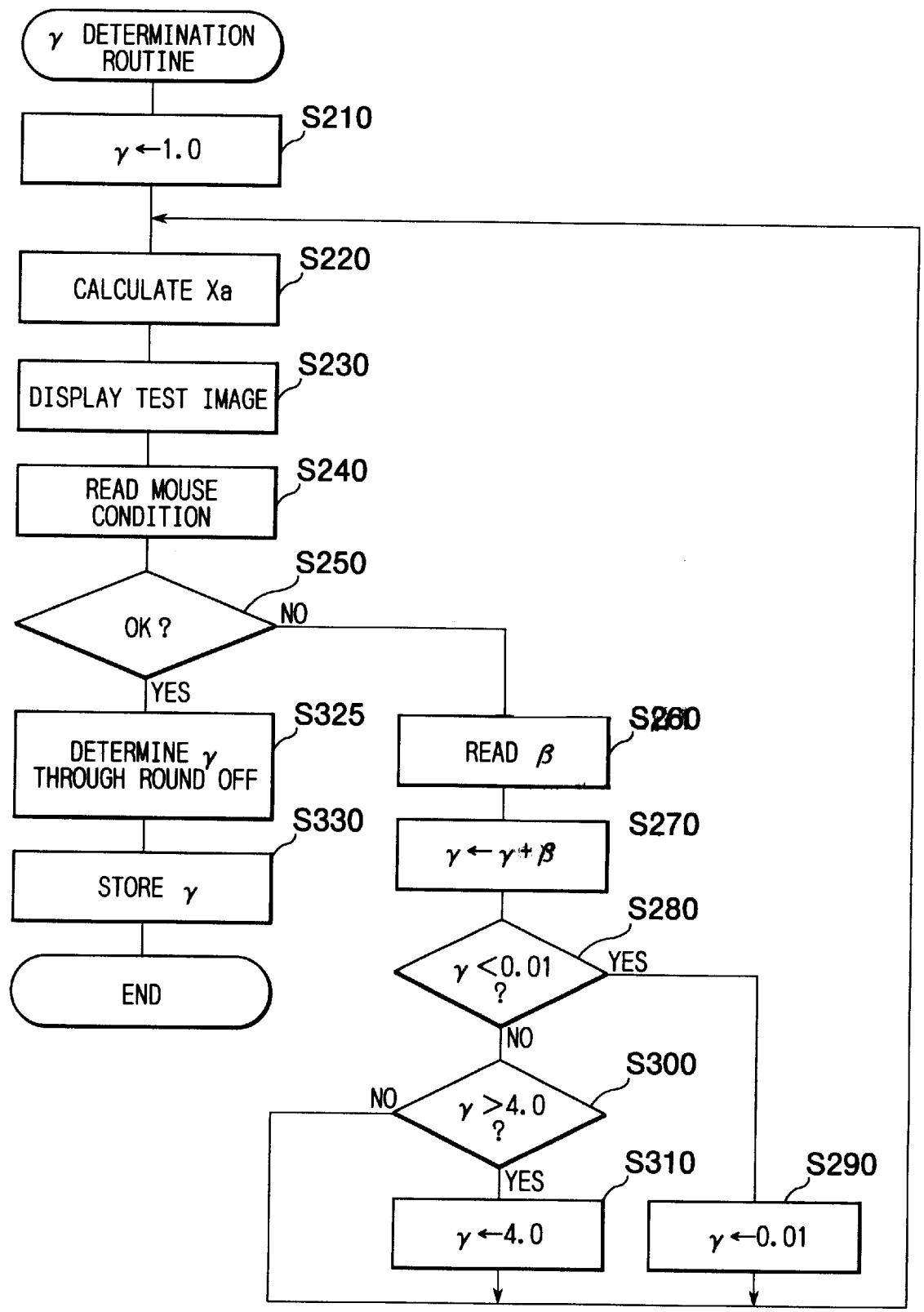
FIG. 17 is a flowchart of a gamma value determination process of a fourth embodiment.

A fourth embodiment will be described below with reference to FIG. 17.

The present embodiment is the same as the first embodiment except that the process of S320 in the gamma determination process of FIG. 10 is replaced with a process of S325 where the gamma value γ, which is obtained when the instruction "OK" is detected, is rounded off to the first decimal place. The thus calculated value is then stored in the hard disk 5 as a gamma value γ of the display 2.

Alternatively, the computer 1 may previously store gamma value candidates of 0.1, 0.2, . . . , 3.9, and 4.0. The gamma candidates are arranged from 0.1 to 4.0 by the equal interval of 0.1. The computer 1 then selects one of the candidates that is closest to a value obtained for the user's slider control in S325. According to the present embodiment, therefore, a slight change in the gamma value can be neglected, and the gamma value can be determined in a stable manner.

It is noted that it is unnecessary to determine the display characteristic function too precisely. It is sufficient to approximate the display characteristic function by one of the previously-determined candidates. It is further noted that determination of the display characteristic function largely depends on a circumferential condition and user's sensitivity to light. Accordingly, the display characteristic function may possibly slightly change at every detection operation. Such a slight difference is preferably neglected. Because one of the several candidates is selected in this modification, the determination result will become stable.

A fifth embodiment will be described below with reference to FIGS. 18–19.

Figure 18:
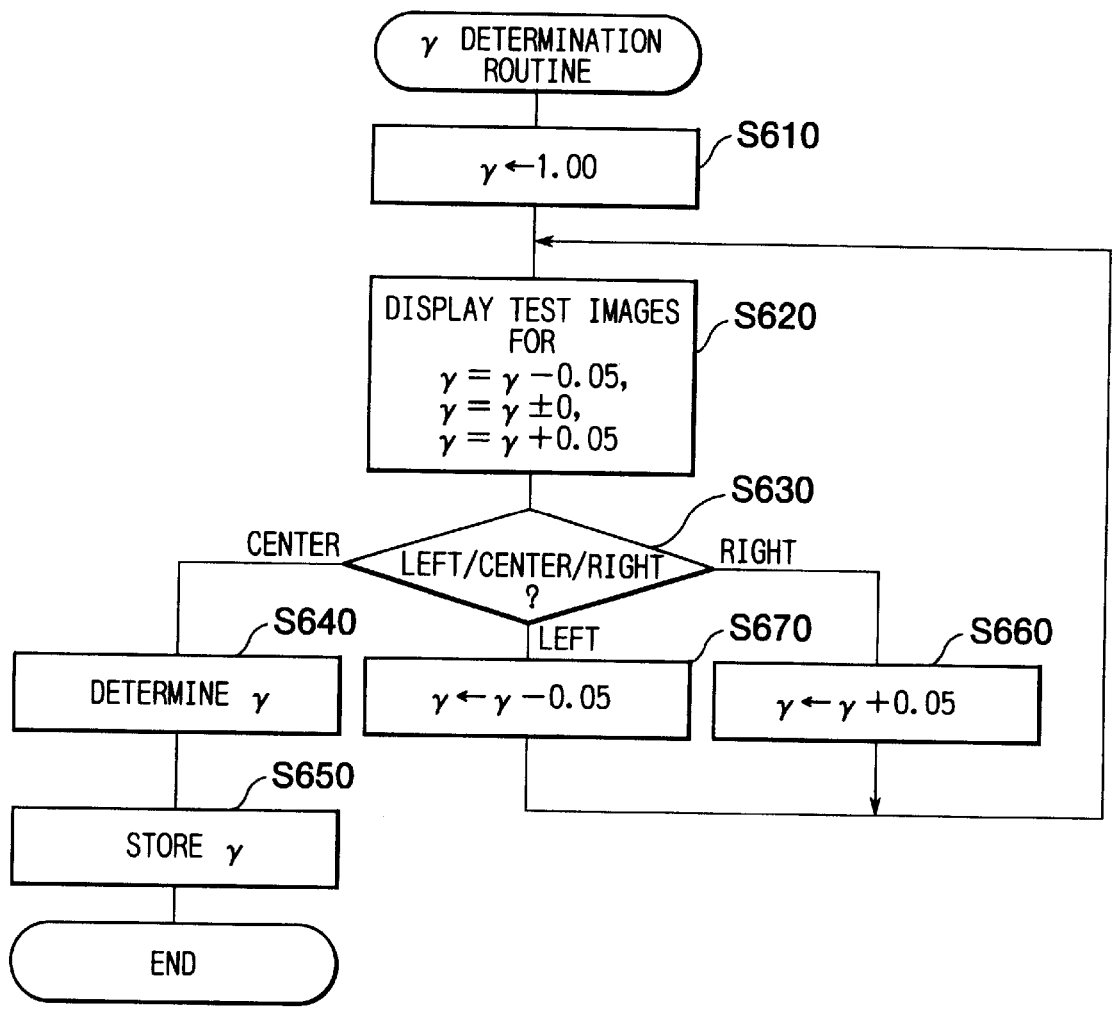
FIG. 18 is a flowchart of a gamma value determination process of a fifth embodiment.
Figure 19:
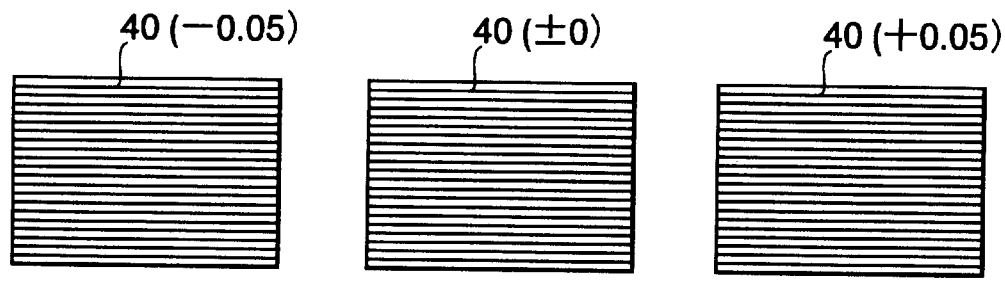
FIG. 19 illustrates how to display gamma determination test images in the fifth embodiment.

The present embodiment employs a gamma determination process program as shown in FIG. 18 in place of the program of FIG. 10 of the first embodiment.

When the program of FIG. 18 is started, an assumption of γ=1.00 is initially set in S610. Then, in S620, a test image 40(±0) is displayed in the central portion of the display screen as shown in FIG. 19 in the same manner as in S220–S230 of the first embodiment. The test image 40 (±0) is the same as that of the test image 40 initially produced in S230 of the first embodiment. According to the present embodiment, during that step, another test image 40(−0.05) is also produced based on another assumption that a gamma value γ is lower than the present gamma value by 0.05, and still another test image 40(+0.05) is also produced based on a still another assumption that a gamma value γ is higher than the present gamma value by 0.05. The test image 40(−0.05) is displayed to the left of the test image 40(±0), and the test image 40(+0.05) is displayed to the right of the test image 40(±0) as shown in FIG. 19. Then, the computer 1 asks the user which of the three images appears most uniform in S630. When the central image 40(±0) is selected, the presently-assumed value γ is set as the gamma value γ of the display 2 in S640 and is stored in the hard disk 5 in S650. On the other hand, when the user selects the right-hand image 40(+0.05), the value γ is incremented by 0.05 in S660. That is, the assumption is renewed into γ=γ+0.05, and the program returns to S620. Similarly, when the user selects the left-hand image 40(−0.05), the value γ is decremented by 0.05 in S670. That is, the assumption is renewed into γ=γ−0.05, and the program returns to S620.

Thus, according to the present embodiment, the computer 1 controls the display 2 to simultaneously display more than one test images obtained for more than one values assumed to the gamma value γ. The several test images are displayed next to one another. The user selects one of the test images that appears most uniform. The computer determines the gamma value γ based on the user's selection. According to the present embodiment, the user compares the plurality of test images and easily determines the most uniform test image. Even an unskilled operator can easily perform his/her selection operation. Because all the test images are produced by the same display format, the user can easily perform his/her judgment.

A sixth embodiment will be described below with reference to FIG. 20.

Figure 20:
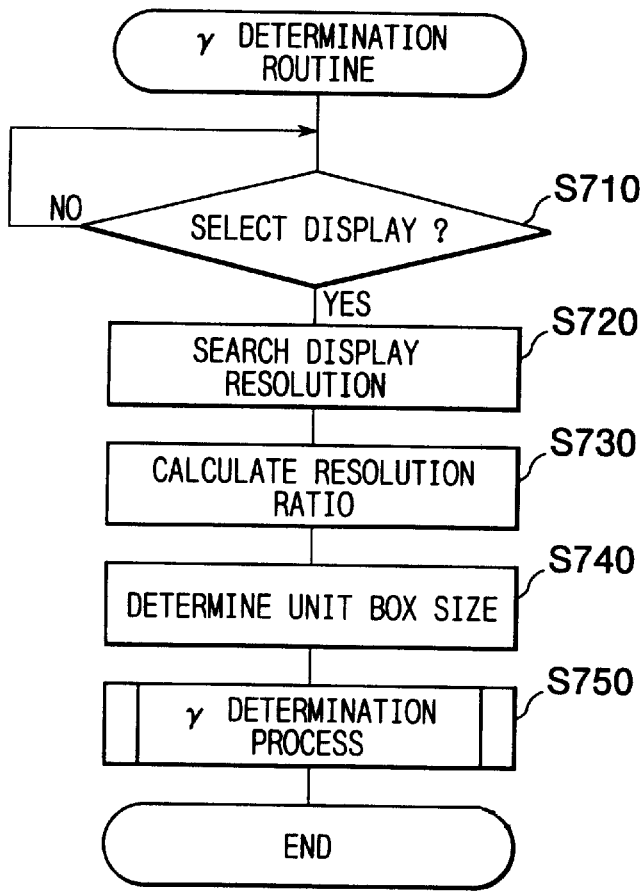
FIG. 20 is a flowchart of a gamma value determination process of a sixth embodiment.

The present embodiment employs a gamma determination process program as shown in FIG. 20 in place of the program of FIG. 10 of the first embodiment.

According to the present embodiment, the hard disk 5 previously stores a display list listing a plurality of types of display employable as the display 2 for the system 7 of FIG. 4(a) and a plurality of resolution data for the plurality of display types.

When the gamma determination program of FIG. 20 is executed, the user first selects a type of the display 2 employed in the system 7 of FIG. 4(a) in S710. During the selection process of S710, the computer 1 controls the display 2 to display the display list indicative of the plurality of types of display employable for the system. The user manipulates the mouse 4 to locate a mouse cursor on his/her selected display type before clicking the mouse button.

When one display type is selected (yes in S710), the computer 1 searches the display list in the hard disk 5 and retrieves data of resolution of the selected display type in S720. Then, in S730, the computer calculates a ratio of the retrieved resolution value with respect to a predetermined standard resolution value. Then, based on the calculated resolution ratio, the computer 1 determines an appropriate size of each unit box in each gradation pattern 20 (30) in S740. Then, a process for determining the gamma value is performed in S750. This process of S750 is the same manner as the steps of S210–S330 in the first embodiment except that each gradation pattern is constructed from unit boxes of the determined size.

According to the present embodiment, when the display has a low resolution and therefore has a large sized pixel, each unit box may be produced by a single pixel. When the display has a higher resolution and therefore has a smaller sized pixel, on the other hand, each unit box may be produced by more than one pixel. Accordingly, any type of display 2 can be controlled to display the substantially same sized gradation patterns which are most appropriate to be visually observed, regardless of the resolution of the display. Accordingly, the user can properly observe the gradation pattern on any type of display.

In the above description, the gradation pattern appropriate for the resolution is produced based on the ratio between the display resolution and the standard resolution. However, the gradation pattern appropriate for the display 2 may be produced in other manners as described below.

(1) A plurality of test images may be previously produced and set for a plurality of display screen resolutions. Each test image has the size and arrangement most appropriate for the corresponding resolution. The computer may select one of the test images for a resolution closest to the resolution of the present display.

(2) A plurality of test images may be previously produced and set for a plurality of display screen gradation characteristics of the plurality of kinds of display. Each test image is prepared to have a tone gradation most appropriate for the corresponding gradation characteristic. For example, for a certain kind of display which can reproduce only a small number of tone levels, each gradation pattern may be constructed from all the reproducible tone levels. For another kind of display which can reproduce a large number of tone levels, each gradation pattern may be constructed from tone levels selected intermittently from all the reproducible tone levels. It is therefore possible to control any kind of display to display substantially the same gradation pattern regardless of the gradation characteristic of the display. Additionally, the number of tone levels to be reproduced in each gradation pattern may be controlled dependent on the gradation characteristic of the display. For example, the number of unit boxes constituting each gradation pattern can be changed according to the gradation characteristic of the display. It is noted that the computer may acquire gradation information of the presently-employed display, and may select a test image having a most appropriate tone gradation.

The present embodiment is provided because the resolution and reproducible tone levels widely vary according to the types of display and display control mechanism. Each unit box size and each unit box tone are therefore preferably changed considering those parameters. It is possible to obtain test images having sizes and gradations appropriate for any types of displays.

A seventh embodiment will be described below with reference to FIG. 21.

Figure 21:
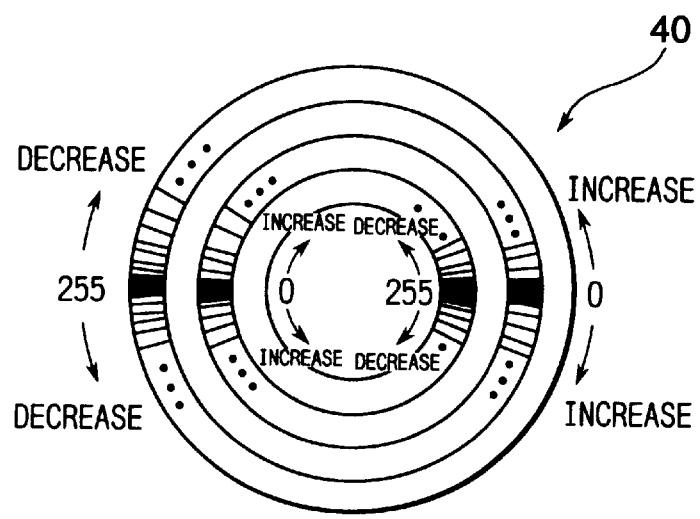
FIG. 21 illustrates a gamma determination test image in a seventh embodiment.

According to the present embodiment, the gradation patterns 20 and 30 used in the gamma determination routine are deformed in a concentrical ring shape as shown in FIG. 21 where each concentrical ring is constructed from two identical gradation patterns whose ends are connected together. That is, in each ring, the unit boxes are arranged so that the brightness value Yd increases from 0 to 255, then decreases from 255 to 0, and then connected to the original position where Yd=0. The rings formed by the two identical patterns 20 and the rings formed by the other two identical patterns 30 are arranged alternately in the radius direction of the concentrical ring shape. Thus-produced test image 40 has no ends, and therefore the user can more easily perceive nonuniformness of the test image 40.

An eighth embodiment will be described below with reference to FIGS. 22 and 23.

In the present embodiment, in the test image 40 for the gamma determination operation, the unit boxes in each raster (i.e. each pattern 20 (30)) scroll from the left to the right in the pattern lengthwise direction, as shown in FIG. 21.

Figure 23:
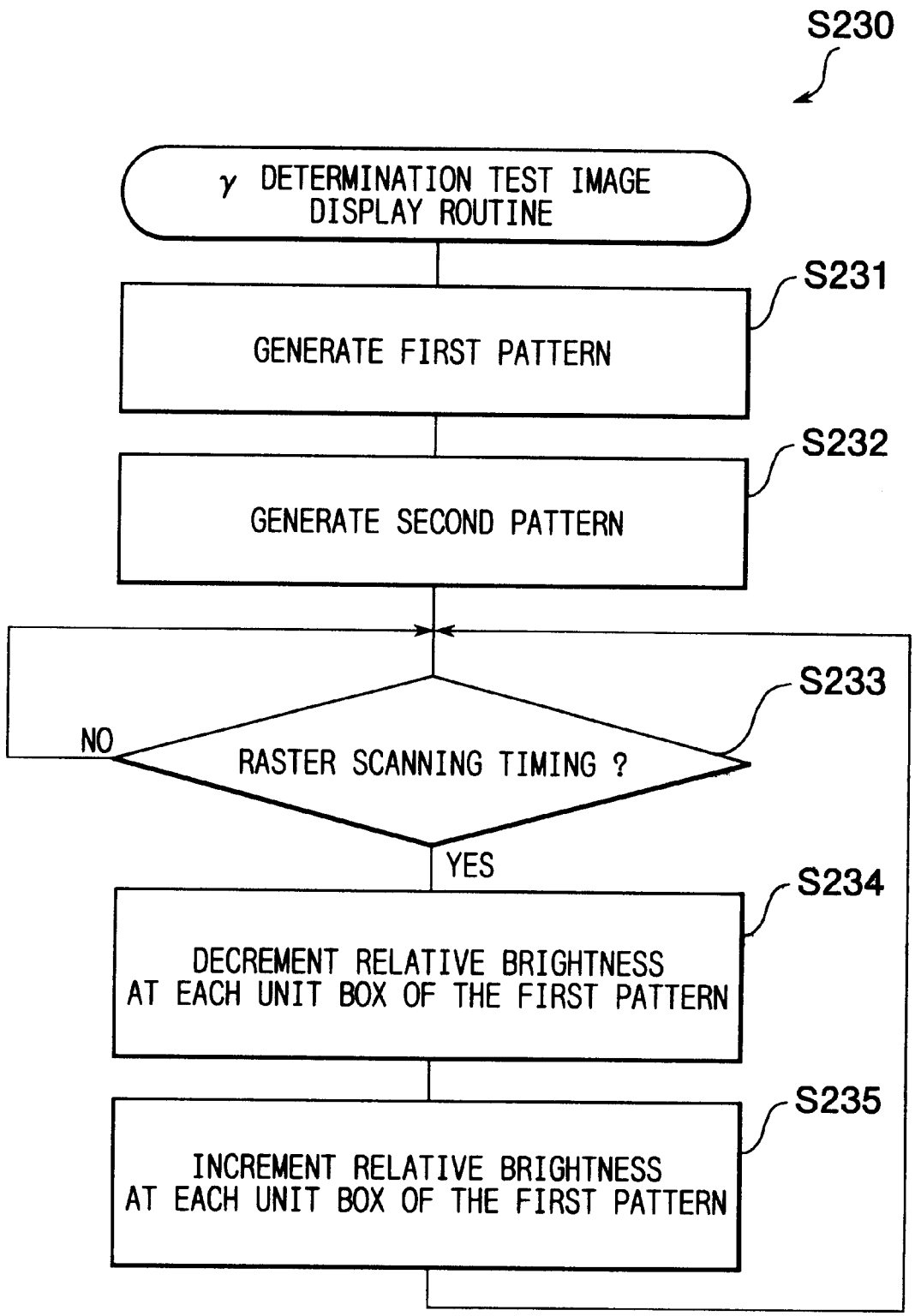
FIG. 23 is a flowchart of a gamma value determination process of the eighth embodiment.

More specifically, the display process of S230 in the gamma determination process of FIG. 10 may be constructed as shown in FIG. 23. That is, in the initial stage, each first pattern 20 is generated with the relative brightness being set to zero at the leftend unit box and the relative brightness being set to 255 at the rightend unit box in S231. Then, in S232, each second pattern 30 is generated with the relative brightness being set to 255 at the leftend unit box and the relative brightness being set to zero at the rightend unit box. Then, at a predetermined interval equal to the raster scanning timing ("yes" in S233), the relative brightness in each unit box in each first pattern 20 is decremented and then each first pattern 20 is generated in S234. Similarly, in S235, the relative brightness in each unit box in each second pattern 30 is incremented and then each second pattern 30 is generated. The processes of S233–S235 are repeatedly performed at the predetermined raster scanning timings until the assumption for the gamma value is changed. It is noted that in S234, when the present relative brightness is zero for a certain unit box, the relative brightness for that unit box is forcibly set to 255 at the next raster scanning timing. Similarly, in S235, when the present relative brightness is 255 for a certain unit box, the relative brightness for that unit box is forcibly set to zero at the next raster scanning timing.

According to the present embodiment, when brightness of the test image 40 is not uniform, a bright vertical band appears to scroll horizontally across the entire test image 40. While observing such a dynamic appearance of the bright band, the user can more easily perceive the nonuniformness of the test image 40.

As described above, according to the present embodiment, the user can judge that the brightness of the test image is not uniform when the brightness of the test image changes dynamically. The user can judge that the brightness of the test image is uniform when the test image appears almost completely still. The user can therefore perform his/her judgment more easily.

Figure 22:
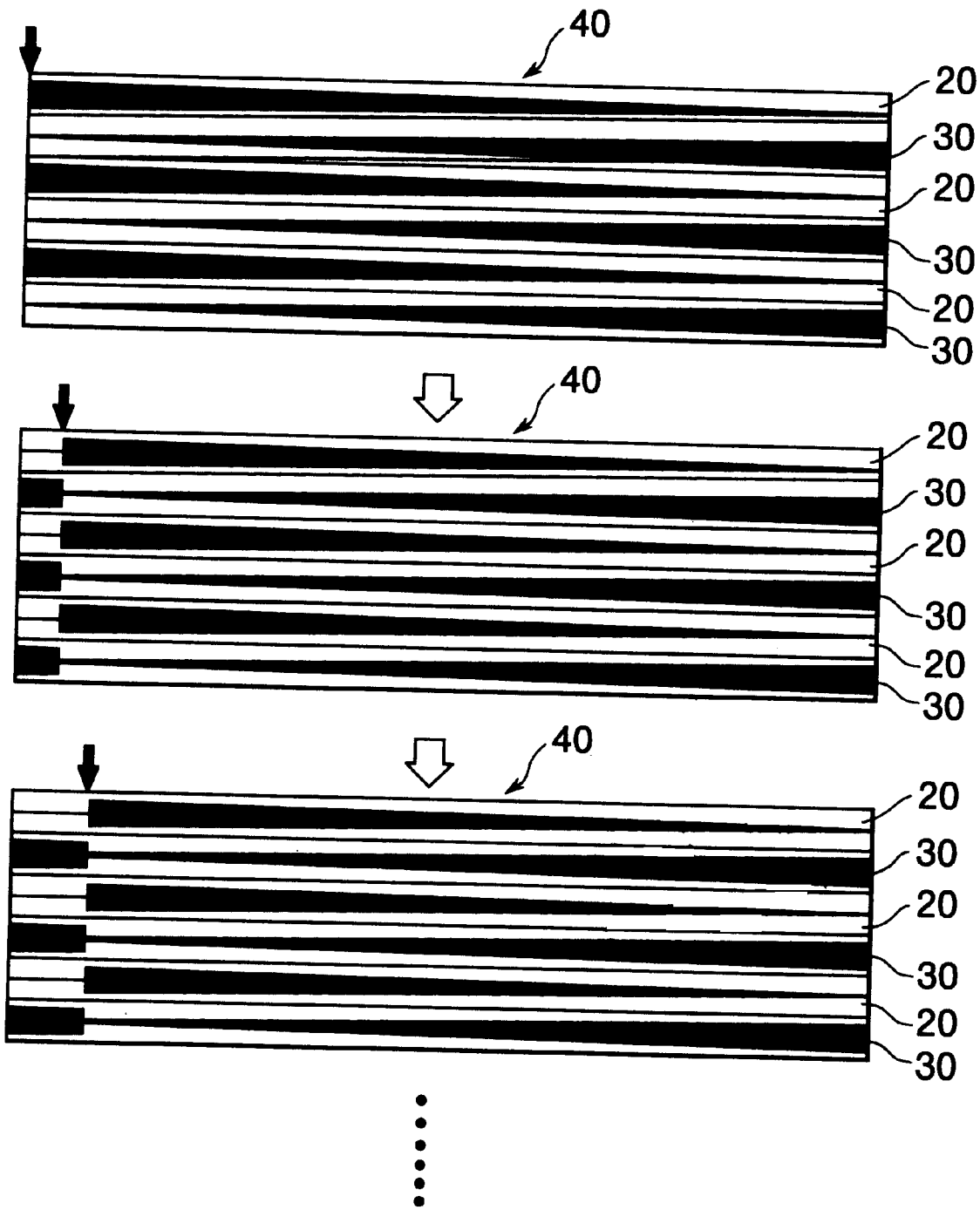
FIG. 22 illustrates a gamma determination test image in an eighth embodiment.
Figure 24:
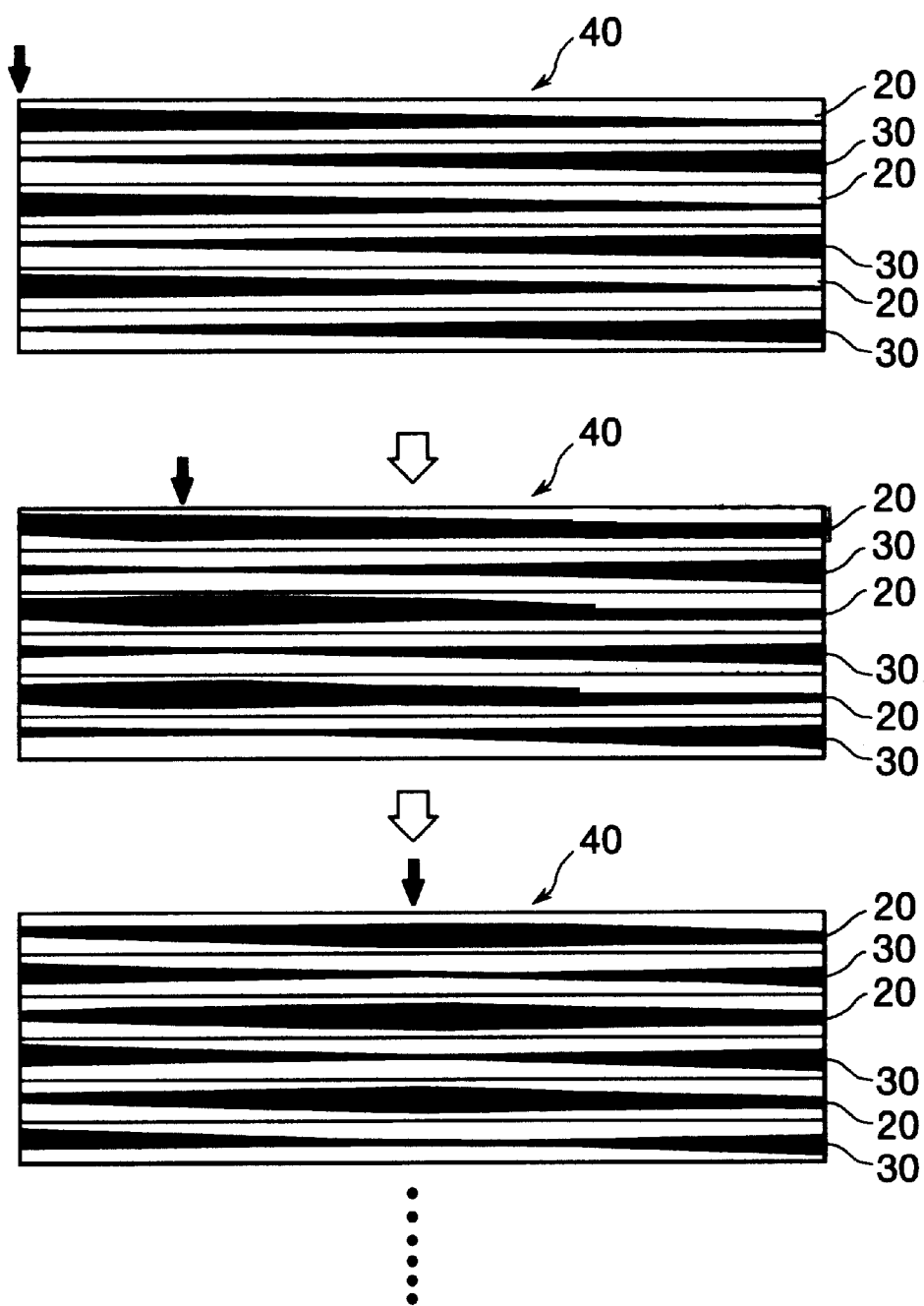
FIG. 24 illustrates a modification of the gamma determination test image in the eighth embodiment.

In the above description, the scrolling operation is performed as shown in FIG. 22 so that the relative brightness of the pattern 20 changes from 255 to zero and the relative brightness of the pattern 30 changes from zero to 255 at the arrow-indicated connecting portion. However, as shown in FIG. 24, each first pattern 20 may be scrolled so that the relative brightness gradually increases from the arrow-indicated connecting position both in the rightward and leftward directions. Each second pattern 30 may be scrolled similarly so that the relative brightness gradually decreases from the arrow-indicated connecting position both in the rightward and leftward directions. In this case, no scrolling-connecting portion will appear noticeable. The user can more easily judge how the test image 40 appears uniform.

As described above, according to the embodiments of the present invention, because the test image is entirely formed based on a single display format. The user can easily judge uniformness of the test image. Additionally, the user can designate a uniform state of the test image only once. The display characteristic function is determined through such a simple operation.

While the invention has been described in detail with reference to the specific embodiments thereof, it would be apparent to those skilled in the art that various changes and modifications may be made therein without departing from the spirit of the invention.

For example, in each of the above-described embodiments, each first pattern 20 is produced to exhibit brightness gradation Yd of 0 to 255, and each second pattern 30 is produced to exhibit brightness gradation Yd of 255 to 0. However, each first pattern 20 and 30 may be produced to exhibit brightness gradation Yd of other brightness ranges. For example, each first pattern 20 and 30 may be produced to exhibit brightness gradation Yd of 10 to 255, and each second pattern 30 may be produced to exhibit brightness gradation Yd of 255 to 10. Thus produced test image 40 will appear entirely lighter than the test image 40 of the above-described embodiments. However, because the display characteristic function and therefore the correction function of the display can be specified by the single gamma value as represented by the formulas (1), (2), and (4), the same appearance tendency will be attained regardless of whether the test image 40 is prepared by any fraction of the display characteristic curve. For the same reasons, each of the first and second patterns 20 and 30 may be prepared by intermittently-selected brightness values Yd such as 0, 2, 4, 6, . . . , and 254 which are selected by the interval of two (2).

In the embodiments, the system 7 is provided with a color monitor-employed display 2. However, the present invention can be applied to another system provided with a monochromatic monitor-employed display 2.

In the above description, the gamma value determined during the gamma determination process is utilized for correcting image data for printing. However, the gamma value may be utilized to calibrate display characteristic of the display 2. That is, the display characteristic changes in time and according to circumferential condition such as circumferential temperature and humidity. Accordingly, it is desirable to control the display 2 to display the same color according to the same image data (Rin, Gin, Bin) supplied from the application program 1a regardless of change in the display state. In order to perform this display control, the display characteristic (gamma value and the black point value) of the display 2 may be detected through the processes of FIGS. 6 and 10 at predetermined time intervals. Then, the change in the display characteristic may be corrected through controlling the display 2 with the corrected image data (Rcor, Gcor, Bcor) obtained in S420 so that the display 2 will continue displaying the same color.

The gamma value may be utilized to make color matching between the display color and a scanner-reading color.

In order to correct image data (Rin, Gin, Bin) for printing, the look up table 100 may be corrected into a corrected look up table 200 immediately after the gamma value and the black point are determined.

The look up table 100 may be corrected into the corrected look up table 200 in a manner described below.

Each set (Ri, Gi, Bi) of the plurality of sets of RGB values, indicative of the respective lattice points in the look up table 100, is corrected into a corrected value set (Ri', Gi', Bi') by the black point value BP and the gamma value T in a manner as described below.

$$Ri'=(Ri/255)^{-\gamma}\cdot(255-BP)+BP$$

$$Gi'=(Gi/255)^{-\gamma}\cdot(255-BP)+BP$$

$$Bi'=(Bi/255)^{-\gamma}\cdot(255-BP)+BP$$

Then, a CMYK control signal set (C'i, M'i, Y'i, K'i) for the corrected value set (Ri', Gi', Bi') is calculated through a volume interpolation method in the same manner as described above. That is, eight lattice points (Ri, Gi, Bi), surrounding a color point indicated by the corrected value set (Ri', Gi', Bi'), are first determined. Then, the CMYK control signal set (C'i, M'i, Y'i, K'i) is calculated through interpolating control signal sets (Ci, Mi, Yi, Ki) stored in the LUT 100 for the searched eight lattice points.

Then, the corrected look up table 200 is produced, in which the RGB data sets (Ri, Gi, Bi) initially stored in the look up table 100 are stored in correspondence with the finally-produced CMYK data sets (C'i, M'i, Y'i, K'i). The thus obtained LUT 200 is indicative of the color conversion characteristic appropriate for the relationship between the display 2 and the printer 6.

When the corrected look up table 200 is thus produced, S420 and S430 can be replaced with a single step for converting image data (Rin, Gin, Bin) into print data (Cout, Mout, Yout, Kout) with using the corrected look up table 200 in a manner as described below.

That is, the print data (Cout, Mout, Yout, Kout) for the image data set (Rin, Gin, Bin) is calculated through a volume interpolation method in the same manner as described above. That is, eight lattice points (Ri, Gi, Bi), surrounding a color point Pin indicated by the image data set (Rin, Gin, Bin), are first determined. Then, the print data (Cout, Mout, Yout, Kout) is calculated through interpolating control signal sets (C'i, M'i, Y'i, K'i) stored in the LUT 200 for the searched eight lattice points.

In the above-described embodiments, the display characteristic is determined for the case where R=G=B. However, the present invention can be applied to determine a display characteristic function for each of the red, green, and blue color components.

What is claimed is:

1. A method of determining a display characteristic function of a display, the method comprising the steps of:
   initially setting at least one assumption on a display characteristic function of a display, the display characteristic function being indicative of a relationship between an input level of image data to be inputted to the display and relative brightness of an image to be displayed on the display by the image data;
   controlling the display to display at least one test image based on the set at least one assumption, each of the at least one test image including a plurality of first gradation patterns and a plurality of second gradation patterns, brightness of each first gradation pattern changing from a predetermined first value to a predetermined second value in one direction in a manner determined by a corresponding assumption, brightness of each second gradation pattern changing from the predetermined first value to the predetermined second value in a reverse direction in the manner determined by a corresponding assumption, the first and second gradation patterns being arranged alternately in the test image so that portions of a second brightness in the first gradation patterns are arranged adjacent to portions of a first brightness in the second gradation patterns;
   selecting one test image whose brightness appears uniform; and
   determining the display characteristic function of the display based on the assumption that provides the selected test image.

2. A method as claimed in claim 1, wherein a user is allowed to select one test image whose brightness appears uniform.

3. A method as claimed in claim 1, wherein a single assumption is initially set for the display characteristic function, thereby controlling the display to display a single test image based on the initially-set assumption, and further comprising the step of changing the assumption to renew the test image until a test image having a uniform brightness is generated to be selected, the display characteristic function of the display being determined based on the assumption that provides the selected test image.

4. A method as claimed in claim 3, wherein the assumption is changed to renew the test image until a user selects a test image that has a uniform brightness.

5. A method as claimed in claim 3, wherein the assumption is changed in a stepwise manner.

6. A method as claimed in claim 1, wherein at least two different assumptions are set for the display characteristic function, the display being controlled to simultaneously display at least two test images based on the set at least two different assumptions, one test image being selected as having a most uniform brightness, the display characteristic function of the display being determined based on the assumption that provides the selected test image.

7. A method as claimed in claim 6, wherein a user selects one test image whose brightness appears most uniform.

8. A method as claimed in claim 1, wherein a plurality of functions are previously set as a plurality of display characteristic function candidates, and wherein the display characteristic function determined according to the assumption that provides the selected test image is compared with the plurality of display characteristic function candidates, and a display characteristic function candidate, that is closest to the display characteristic function determined according to the assumption, is determined as the display characteristic function of the display.

9. A method as claimed in claim 1, wherein the at least one assumption for the display characteristic function is initially set according to a condition corresponding to a type of the display.

10. A method as claimed in claim 1, wherein each of the first and second gradation patterns is formed by a plurality of unit boxes each having an equal size and exhibiting a brightness determined dependent on the set assumption.

11. A method as claimed in claim 10, wherein the size of each unit box in each first and second gradation pattern is determined dependent on a resolution of the display.

12. A method as claimed in claim 10, wherein the number of the unit boxes in each gradation pattern is determined dependent on a gradation characteristic of the display.

13. A method as claimed in claim 10, wherein each unit box in each of the first and second gradation patterns is scrolled in a direction in which the unit boxes are arranged.

14. A method as claimed in claim 1, wherein the display characteristic function of the display is of an exponential function, and the assumption on the display characteristic function is set as an assumption for an index of the exponential function.

15. A method as claimed in claim 1, wherein each of the first and second gradation patterns is comprised of a single raster whose brightness is changed along the raster extending direction according to the set assumption.

16. A method as claimed in claim 1, wherein each of the first and second gradation patterns is comprised of a plurality of unit boxes which are arranged in a ring shape so that the relative brightness increases from the first brightness to the second brightness and then decreases from the second brightness to the first brightness in each ring.

17. A device for determining a display characteristic function of a display, the device comprising:
    means for initially setting at least one assumption on a display characteristic function of a display, the display characteristic function being indicative of a relationship between an input level of image data to be inputted to the display and relative brightness of an image to be displayed on the display by the image data;
    means for controlling the display to display at least one test image based on the set at least one assumption, each of the at least one test image including a plurality of first gradation patterns and a plurality of second gradation patterns, brightness of each first gradation pattern changing from a predetermined first value to a predetermined second value in one direction in a manner determined by a corresponding assumption, brightness of each second gradation pattern changing from the predetermined first value to the predetermined second value in a reverse direction in the manner determined by a corresponding assumption, the first and second gradation patterns being arranged alternately in the test image so that portions of a second brightness in the first gradation patterns are arranged adjacent to portions of a first brightness in the second gradation patterns;
    means for selecting one test image whose brightness appears uniform; and
    means for determining the display characteristic function of the display based on the assumption that provides the selected test image and for storing the determined display characteristic function.

18. A device as claimed in claim 17, wherein the selecting means enables a user to select one test image whose brightness appears uniform.

19. A device as claimed in claim 17, wherein the assumption setting means initially sets a single assumption for the display characteristic function, the control means controlling the display to display a single test image based on the initially-set assumption, and
    further comprising means for changing the assumption to renew the test image until a test image having a uniform brightness is generated to be selected, the determination means determining the display characteristic function of the display based on the assumption that provides the selected test image.

20. A device as claimed in claim 19, wherein the assumption changing means changes the assumption to renew the test image until a user selects a test image that has a uniform brightness.

21. A device as claimed in claim 19, wherein the assumption changing means changes the assumption in a stepwise manner.

22. A device as claimed in claim 17, wherein the assumption setting means sets at least two different assumptions for the display characteristic function, the control means controlling the display to simultaneously display at least two test images based on the set at least two different assumptions, one test image being selected as having the most uniform brightness, the determination means determining the display characteristic function of the display based on the assumption that provides the selected test image.

23. A device as claimed in claim 22, wherein the selection means enables a user to select one test image whose brightness appears most uniform.

24. A device as claimed in claim 17, further comprising storage means for previously storing a plurality of functions as a plurality of display characteristic function candidates, and wherein the determination means includes:
    comparison means for comparing the display characteristic function, determined according to the assumption that provides the selected test image, with the plurality of display characteristic function candidates; and
    candidate selection means for selecting a display characteristic function candidate, that is closest to the display characteristic function determined according to the assumption, and for determining the selected candidate as the display characteristic function of the display.

25. A device as claimed in claim 17, wherein the assumption setting means initially sets the at least one assumption for the display characteristic function according to a condition corresponding to a type of the display.

26. A device as claimed in claim 17, wherein the control means forms each of the first and second gradation patterns by a plurality of unit boxes each having an equal size and exhibiting a brightness determined dependent on the set assumption.

27. A device as claimed in claim 26, wherein the control means determines the size of each unit box in each first and second gradation pattern dependent on a resolution of the display.

28. A device as claimed in claim 26, wherein the control means determines the number of the unit boxes in each gradation pattern dependent on a gradation characteristic of the display.

29. A device as claimed in claim 26, wherein the control means scrolls each unit box in each of the first and second gradation patterns in a direction in which the unit boxes are arranged.

30. A device as claimed in claim 17, wherein the display characteristic function of the display is of an exponential function, and the assumption on the display characteristic function is set as an assumption for an index of the exponential function.

31. A device as claimed in claim 17, wherein each of the first and second gradation patterns is comprised of a single raster whose brightness is changed along the raster extending direction according to the set assumption.

32. A device as claimed in claim 17, wherein each of the first and second gradation patterns is comprised of a plurality of unit boxes which are arranged in a ring shape so that the relative brightness increases from the first brightness to the second brightness and then decreases from the second brightness to the first brightness in each ring.

33. A printer system, comprising:
a display having a display characteristic function indicative of a relationship between an input level of image data to be inputted to the display and relative brightness of an image to be displayed on the display by the image data;
a printer having print control means for performing a printing operation with image data inputted thereto;
a device for determining the display characteristic of the display, the device including:
means for initially setting at least one assumption on the display characteristic function of the display;
means for controlling the display to display at least one test image based on the set at least one assumption, each of the at least one test image including a plurality of first gradation patterns and a plurality of second gradation patterns, brightness of each first gradation pattern changing from a predetermined first value to a predetermined second value in one direction in a manner determined by a corresponding assumption, brightness of each second gradation pattern changing from the predetermined first value to the predetermined second value in a reverse direction in the manner determined by a corresponding assumption, the first and second gradation patterns being arranged alternately in the test image so that portions of a second brightness in the first gradation patterns are arranged adjacent to portions of a first brightness in the second gradation patterns;
means for selecting one test image whose brightness appears uniform; and
means for determining the display characteristic function of the display based on the assumption that provides the selected test image and for storing the determined display characteristic function; and
a printer input data correction device for correcting an input level of image data for being inputted to the print control means based on the display characteristic function stored in the display characteristic function determining and storing means, thereby controlling the printer to print an image consistent with the image displayed on the display.

34. A device for determining a gamma value, the device comprising:
means for assuming a gamma value indicative of a display characteristic of a display;
means for instructing change of the assumed gamma value;
means for controlling the display to display a test image according to the gamma value presently assumed by the assuming means and by the instructing means, the test image including a plurality of first rasters and a plurality of second rasters, brightness of each first raster increasing from a predetermined first value to a predetermined second value from left to right, brightness of each second raster increasing from the predetermined first value to the predetermined second value from right to the left, the first and second rasters being arranged alternately so that portions having a second brightness of the first rasters are arranged adjacent to a portions having the first brightness of the second rasters;
means for enabling a user to input a determination instruction to determine a gamma value of the display when the test image appears entirely uniform; and
means for storing, as the gamma value for the display, the gamma value presently assumed when the determining instruction is inputted.

35. A device as claimed in claim 34, wherein the control means continuously displays the test image while shifting the brightness state of each raster in the raster extending direction so that the brightness of each raster is scrolled in the raster extending direction.

36. A device as claimed in claim 34, wherein the gamma value changing instruction means instructs change in the gamma value according to a position of a scroll bar displayed on the display.

37. A printer system, comprising:
a display with a gamma value;
a printer having print control means for performing a printing operation with image data inputted thereto;
a device for determining a gamma value of the display, the determining device including:
means for assuming a gamma value indicative of a display characteristic of a display;
means for instructing change of the assumed gamma value;
means for controlling the display to display a test image according to the gamma value presently assumed by the assuming means and by the instructing means, the test image including a plurality of first rasters and a plurality of second rasters, brightness of each first raster increasing from a predetermined first value to a predetermined second value from left to right, brightness of each second raster increasing from the predetermined first value to the predetermined second value from right to the left, the first and second rasters being arranged alternately so that portions having a second brightness of the first rasters are arranged adjacent to the portions having a first brightness of the second rasters;
means for enabling a user to input a determination instruction to determine a gamma value of the display when the test image appears entirely uniform; and
means for storing, as the gamma value for the display, the gamma value presently assumed when the determining instruction is inputted; and
printer input data correction means for correcting an input level of image data for being inputted to the print control means based on the gamma value stored in the gamma value storing means, thereby controlling the printer to print an image consistent with the image displayed on the display.

38. A device for determining a display characteristic function, the device comprising:
means for setting an assumption for a display characteristic function indicative of a relationship between an input level of image data to be inputted to a display and relative brightness of an image to be displayed on the display with the image data;
means for changing the assumption for the display characteristic function;

means for controlling the display to display a test image according to a display characteristic function determined based on the assumption, the test image including a plurality of first gradation patterns and a plurality of second gradation patterns, brightness of each first gradation pattern continuously changing from a predetermined minimum value to a predetermined maximum value by every predetermined value in one direction, brightness of each second gradation pattern continuously changing from the predetermined minimum value to the predetermined maximum value by the every predetermined value in a reverse direction, the first and second gradation pattern being arranged alternately so that portions having the maximum brightness in the first gradation patterns are arranged adjacent to portions having the minimum brightness in the second gradation patterns;

means for enabling a user to input a determination instruction for determining a display characteristic function for the display when brightness of the test image appears entirely uniform; and means for determining, as a display characteristic function for the display, the display characteristic function determined for the present assumption when the determination instruction is inputted and for storing the determined display characteristic function.

39. A device as claimed in claim 38, further comprising:

display type specifying means for specifying a type of the display; and assumption setting condition storing means for storing a plurality of setting conditions of the assumption to be set by the assumption setting means according to a plurality of types of the display, wherein the assumption setting means sets an assumption according to an assumption setting condition which is selected from the assumption setting condition storing means according to the type specified by the display type specifying means.

40. A device as claimed in claim 38, further comprising display condition specifying means for specifying at least one of a resolution and a gradation display characteristic of the display, and wherein the test image generating means changes at least one of the size of each unit box and the number of gradations in each of the first and second gradation patterns based on the specified at least one of resolution and gradation display characteristic.

41. A device for determining a display characteristic function, the device comprising:

first assumption setting means for setting a first assumption for a display characteristic function indicative of a relationship between an input level of image data to be inputted to a display and relative brightness of an image to be displayed on the display with the image data;

second assumption setting means for setting a second assumption which is obtained through changing the first assumption;

means for controlling the display to display, on a first image region, a test image according to a display characteristic function determined based on the first assumption, the test image including a plurality of first gradation patterns and a plurality of second gradation patterns, brightness of each first gradation pattern continuously changing from a predetermined minimum value to a predetermined maximum value by every predetermined value in one direction, brightness of each second gradation pattern continuously changing from the predetermined minimum value to the predetermined maximum value by the every predetermined value in a reverse direction, the first and second gradation patterns being arranged alternately so that portions having the maximum brightness in the first gradation patterns are arranged adjacent to portions having the minimum brightness in the second gradation patterns, and for simultaneously controlling the display to display, on a second image region, another test image according to the display characteristic function determined based on the second assumption;

means for selecting a test image which appears more uniform than the other; and means for determining, as a display characteristic function for the display, the display characteristic function determined based on an assumption that provides the selected test image and for storing the determined display characteristic function.

* * * * *